United States Patent [19]

Ohta et al.

[11] Patent Number: 5,170,390
[45] Date of Patent: Dec. 8, 1992

[54] OPTICAL RECORDING ELEMENT AND DRIVING SYSTEM

[75] Inventors: Kenji Ohta; Tetsuya Inui; Hiroyuki Katayama; Akira Takahashi; Junji Hirokane, all of Nara; Yukinori Nishitani, Neyagawa; Michinobu Mieda; Kazuo Van, both of Nara, all of Japan

[73] Assignee: Sharp Kabushiki Kaisha, Osaka, Japan

[21] Appl. No.: 394,750

[22] Filed: Aug. 16, 1989

[30] Foreign Application Priority Data

| Aug. 22, 1988 [JP] | Japan | 63-208623 |
| Oct. 28, 1988 [JP] | Japan | 63-274096 |
| Dec. 27, 1988 [JP] | Japan | 63-330955 |
| Feb. 21, 1989 [JP] | Japan | 1-40591 |

[51] Int. Cl.$^5$ .................... G11B 11/10; G11B 3/78
[52] U.S. Cl. ........................... 369/288; 369/278
[58] Field of Search ........... 369/273, 274, 275.4, 369/280, 283, 284, 288, 277, 278, 279

[56] References Cited

U.S. PATENT DOCUMENTS

| 4,731,755 | 4/1988 | Bjorklund et al. | 369/284 |
| 4,778,747 | 10/1988 | Ohta et al. | 369/279 |
| 4,818,648 | 4/1989 | Ohta et al. | 369/279 |
| 4,852,076 | 6/1989 | Ohta et al. | 369/277 |
| 4,877,713 | 10/1989 | Fujita et al. | 369/277 |
| 4,949,331 | 8/1990 | Maeda et al. | 369/278 |

FOREIGN PATENT DOCUMENTS

| 083193 | 12/1982 | European Pat. Off. |
| 169433 | 7/1985 | European Pat. Off. |
| 197256 | 2/1986 | European Pat. Off. |
| 228909 | 12/1986 | European Pat. Off. |
| 581839 | 6/1981 | Japan . |
| 59210547 | 5/1983 | Japan . |
| 62285247 | 6/1986 | Japan . |
| 63133335 | 11/1986 | Japan . |
| 63146247 | 12/1986 | Japan . |

OTHER PUBLICATIONS

EPA #111988, Apr. 28, 1983, Kenji Ohta et al., "Magneto-optic Memory Device."

Primary Examiner—William M. Shoop, Jr.
Assistant Examiner—John W. Cabeca

[57] ABSTRACT

An optical recording element comprising a recording medium which includes an information recording area formed at every unit in a non-continuous condition, the recording medium further including sample pits disposed at intervals of a fixed distance for providing basic information about the locations of recording units in the same track. Each sample pit comprises a plurality of pits disposed next to the sequence of the recording units so that the spacing between the pits differs from the spacing between the recording units. At least one of the plurality of pits is a long-sized inclined pit which is inclined at an angle in the range of 6° to 80° to a recording track. A driving system for driving the optical recording element for recording information in the non-continuous recording area or erasing information stored therein with a light beam the output of which is varied as required and checking whether said recording or erasing has been correctly performed, within a very short time in which the light beam passes through the non-continuous recording area. By using the optical recording element in combination with its driving system, the processing speed for reducing, erasing and verifying these functions can be greatly improved and the irradiating position of the light beam at every recording unit can be correctly controlled.

18 Claims, 18 Drawing Sheets

TRACKING ERROR DETECTION SIGNAL

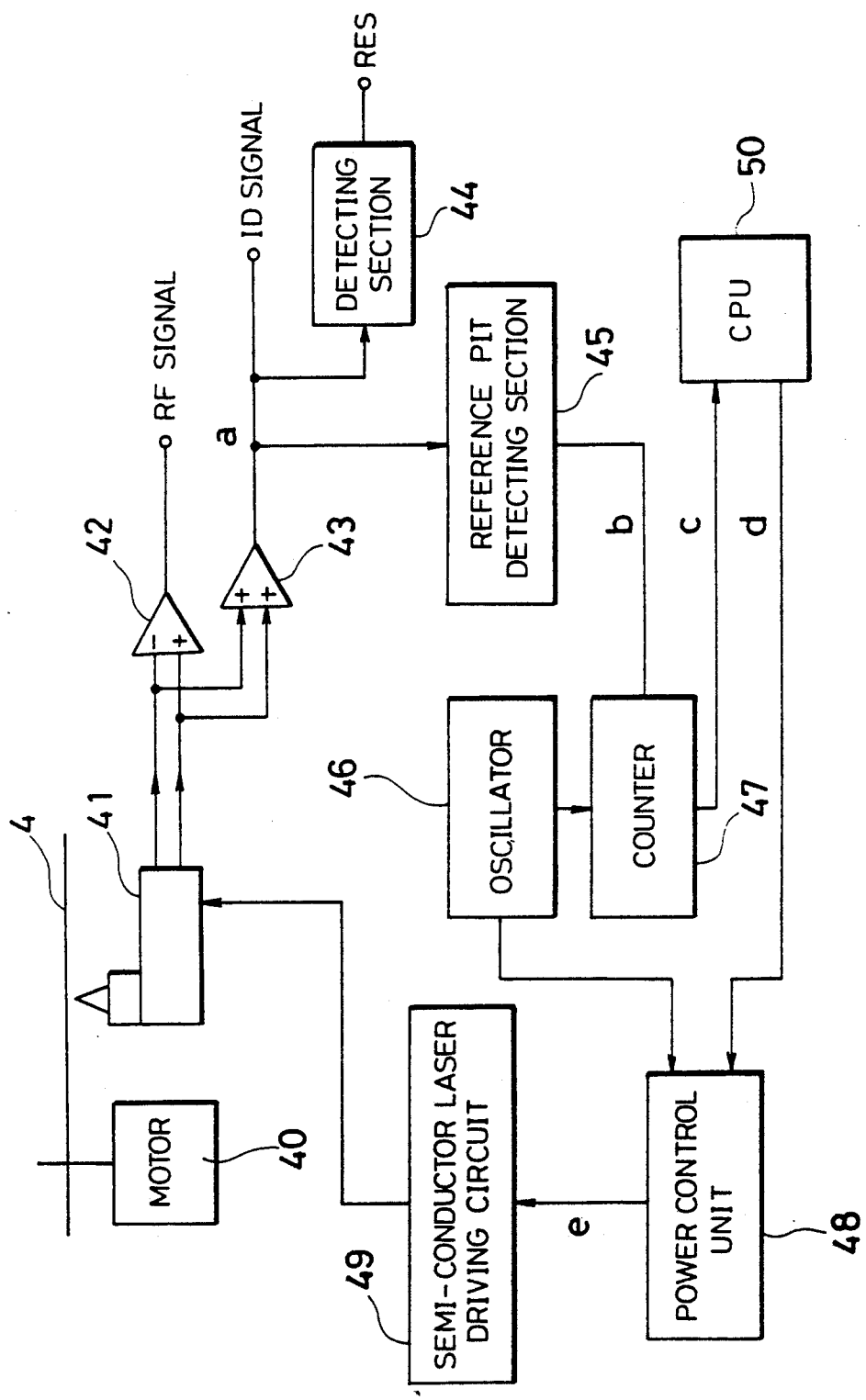

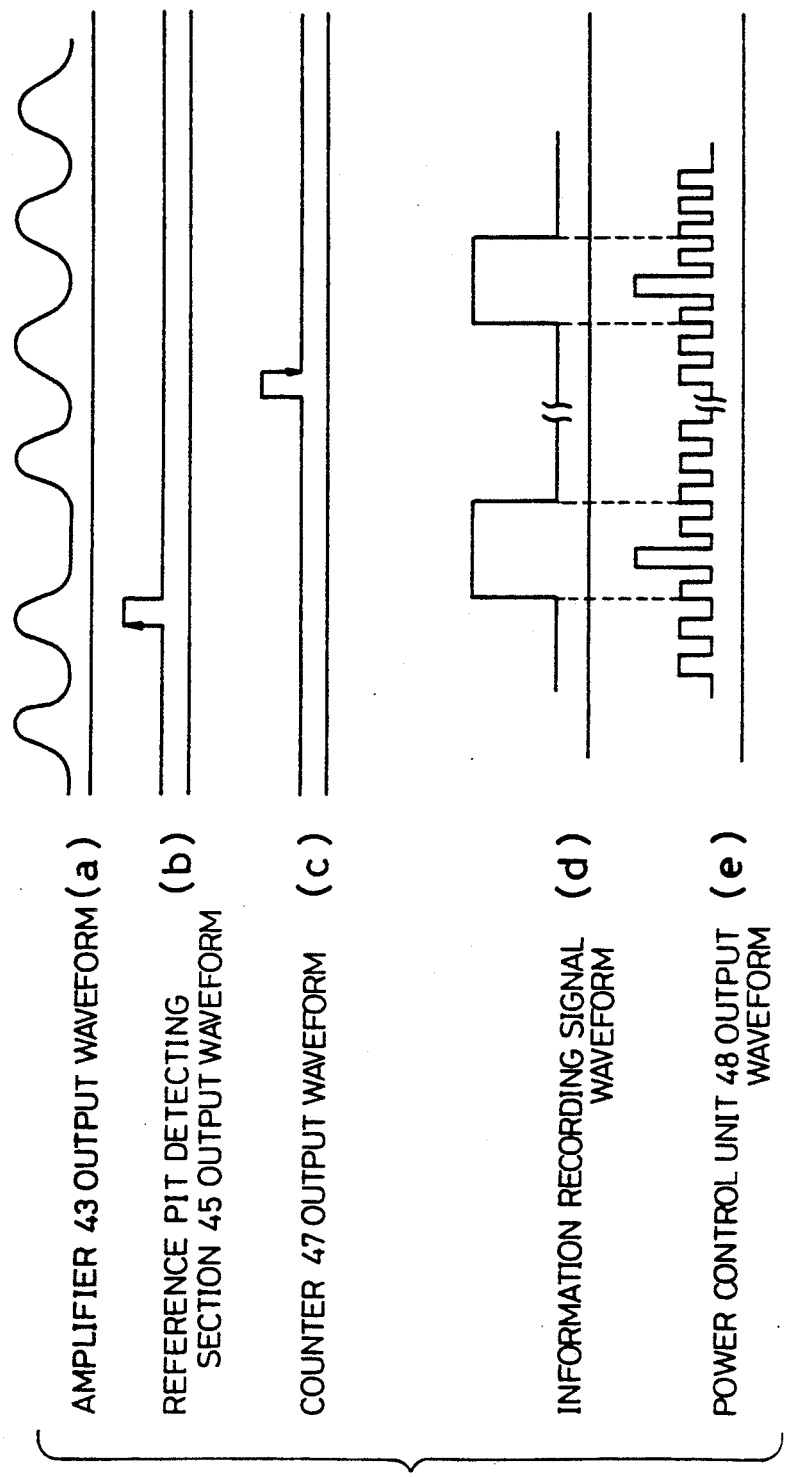

OPTICAL RECORDING ELEMENT AND DRIVING SYSTEM

FIELD OF THE INVENTION

This invention relates to an optical recording element and driving system for use in recording reading, and erasing information stored in the optical recording element.

BACKGROUND OF THE INVENTION

Optical recording elements on which a projected laser beam from a semi-conductor laser or other devices perform the recording/retrieval/erasing of information, have attracted attention as high-density recording mediums have been developed with large storage capacity and high portability. A magneto-optical recording element using a magnetic film as a recording medium is the most developed device in rewritable optical recording elements. A magneto-optical disk comprises a recording film containing a magnetic film having vertical magnetic anisotropy formed on a transparent substrate in which information is recorded by reversing the direction of the magnetization of the recording film. In an optical memory system for such a magneto-optical recording element, the recording and erasing of information are performed by changing the condition of the magnetization of the recording film with an external magnetic field applied thereto while the temperature of the recording film is raised by a laser beam, or by the demagnetizing field of the magnetic film itself. On the other hand, the retrieval of information is performed by utilizing the effect that when the laser beam incident on the recording medium is reflected, the plane of polarization of the beam is rotated according to the direction of the magnetization.

Such an optical memory system verifies whether information is properly recorded on the element when new information is recorded in an area of the optical recording element (optical disk) where no information is stored therein. In the use of a conventional optical memory system, the aforementioned check cannot be performed until the optical disk rotates one time and the recording area thereof returns to the position opposing the optical head (a first rotation) after the completion of information recording.

In the case of recording different information in an area where information has been previously recorded, the following steps are taken in order to check whether the recording operation has been correctly performed: (i) the previous information stored in the recording area is erased by setting the magnetization of the recording film in the initial direction; (ii) the optical disk rotates a single revolution so that the recording area returns to the position opposing to the optical head (a first rotation); (iii) the new information is recorded in the recording area; (iv) the optical disk rotates another single revolution so that the recording area returns to the aforesaid position (a second rotation); and (v) the new information is read out.

As described above, in order to confirm whether the recording of information has been correctly performed, at least the time for one rotation of the optical disk is required in the former case and at least the time for two rotations of the optical disk is required in the latter case. This brings about a considerable increase in the time required for information recording and verification.

In recent years, the light beams of a semi-conductor laser or the like have been utilized for performing the recording/retrieval/erasing of information on such an optical recording element. A lens system for converging a light beam from the semi-conductor so as to irradiate the optical recording element and an optical system (e.g. optical pick-up device) comprising a photodetector for detecting the luminous energy of reflected light from the optical recording element are required to be two-dimentionally moved in relation to the optical recording element at a high speed. Therefore, it is quite difficult to accurately and precisely position the optical system in relation to the optical recording element.

In a conventional method, while rotating the disk-shaped optical recording element, the optical system is one-dimentionally moved in the radial direction of the optical recording element, thereby recording information on the disk surface of the optical recording element, and reading or erasing the information recorded therein.

Generally, such a disk-shaped optical recording element has, as shown in FIG. 22, a number of guiding grooves 80 disposed on one surface of a substrate 79 for guiding a converged light beam 82, and a recording film 81 on the same surface provided with the guiding grooves 80. The recording/retrieval/erasing of information are performed by directing a light beam 82 converged by an objective lens 83 from the other surface of the substrate 79 onto recording grooves 84.

The guiding grooves 80 are disposed in large numbers on the substrate 79 for the purpose of performing the accurate positioning of the converged light beam so as to record information in a desired area or read out the same from a desired area. As shown in FIG. 23, it is common in such an arrangement that a sequence of pits 85 are interposed in each of the recording grooves 84 at a part and the address of the recording groove 84 is indicated by the lengths and positions of the pits 85. More specifically, a recording film is formed in a continuous form on a transparent substrate whose surface is uneven with guiding grooves and address pits. These grooves and pits are formed by recessing portions of the substrate.

If the power of a semi-conductor laser used for recording information is unexpectedly high (in fact, recording power varies depending on an optical memory system), it often happens in the above optical recording element that a recording bit 86 recorded on the recording film over the portion of the recording groove 84 extends to the recording film constituting the adjacent guiding grooves 80 as shown in FIG. 24. As a result, a signal, which should not be read out, is intermixed with a correct signal when reading a signal from either of the adjacent guiding grooves 80 used the light beam. This results in the occurrence of crosstalk.

Such deformation of recording bits is seen in the direction of the recording grooves. That is, the sizes of recording bits vary in the direction of the recording grooves due to variation in recording power resulting in deterioration of signal quality.

A recording bit in an optical memory system used for the optical recording element such as an optical disk and magneto-optical disk has a very small area, i.e. approximately 1 $\mu m^2$, so that accurate and precise control is required in the accessing operation of light beam. In the field of an optical disk for data recording, two types of tracking methods employed; a continuous groove method and a sampling method.

In the continuous groove method, a groove 92 is disposed on a substrate 91 as shown in FIG. 25 and the diffraction of a light beam at the groove 92 is utilized for detecting dislocation of the light beam.

More specifically, a light beam from a laser beam source (not shown) is irradiated on the groove 92 formed on the substrate 91 through a half mirror 93 and objective lens 94. A reflected light from the groove 92 is incident on a two element photodetector 95 after passing through the objective lens 94 and half mirror 93. The differential between signals respectively issued from photodetecting sections 95a and 95b in the two-separate photodetector 95 is amplified by a differential amplifier 96, thereby generating a tracking error detection signal.

In the sampling method, as shown in FIG. 26, a substrate 97 is provided thereon with a pair of pits 98 and 99 for detecting tracking errors, which are spaced in a perpendicular direction to the track, with the center line of the track indicated by arrow B therebetween. These bits are positioned equidistant from the center line B on which data pits 100 are aligned. The amplitude of the read out signals respectively issued from the pits 98 and 99 are compared, and if the amplitude $S_1'$ of the read out signal from the pit 98 is greater than the amplitude $S_2'$ of the read out signal from the pit 99 (see FIG. 27(a)), the light beam is deemed to be closer to the pit 98 along the direction indicated by arrow A. If the amplitude $S_1$ and $S_2$ of the read out signals from the pits 98 and 99 are equivalent (see FIG. 27(b)), the light beam is deemed to be in the center of the track along the direction indicated by arrow B, and if the amplitude $S_2''$ of the read out signal from the pit 99 is greater than the amplitude $S_1''$ of the read out signal from the pit 98, the light beam is in a position closer to the pit 99 along the direction indicated by arrow C. A pair of pits 98 and 99 are disposed in large numbers on the track.

In the sampling method described above, reflected lights from the pits 98 and 99 disposed on the substrate 97 successively pass through the objective lens 94 and half mirror 93, and then are incident on the photodetector 101, as shown in FIG. 28. Thereafter, signals generated in accordance with the amplitude of the read out signals from the pits 98 and 99 are transmitted in succession from the photodetector 101 to a shift register 103 through a waveform shaping circuit 102. The differential between the read out signals of the pits 98 and 99 is obtained according to a signal from a timing signal generator 104 and amplified by the differential amplifier 105 in order to issue a tracking error detection signal.

In the above continuous groove method as shown in FIG. 25, even if the light beam accesses the appropriate position, i.e. the center of the track, the tracking error detection signal does not become "0" when the substrate 91 is inclined. Therefore, a problem exists in that it is difficult to judge whether the tracking error detection signal does not become "0" because of a tracking error or because of the inclined substrate 91. In order to overcome the above problem, incline of the substrate 91 has to be limited a small allowable range in this method.

Although such a tracking error detection signal caused by the incline of the substrate is hardly generated in the sampling method shown in FIG. 26 to FIG. 28, the sizes of the pits 98 and 99 are required to be accurate in width and depth in order to perform the accurate detection of tracking errors. Since the detection of a read out signal is performed by sampling in this method, the time at which the light beam passes through the pits 98 and 99 is determined beforehand. This requires the accurate positioning of the pair of pits 98 and 99, in relation to another pair of pits 98 and 99, causing an increase in the production cost of the substrate 97.

SUMMARY OF THE INVENTION

It is an object of the present invention, to provide an optical recording element and driving system that when recording information in an optical records element, recording and verifies whether the recording has been appropriately performed for every recording unit in a very short time to improve processing speed and to precisely control the irradiating position of a light beam in each recording unit thereby accurately performing recording operations.

A further object of the present invention is to provide a system wherein the phase difference between read out signals from sample pits is detected whereby a tracking error detection signal will not be affected by the incline of the optical recording element even if it is inclined.

A further object of the present invention is to provide a system wherein the phase difference between read out signals from sample pits is detected, whereby the influence of the widths and depths of the tracking error detection sections which constitute the sample pit is reduced even when the above tracking error detection sections are in the form of pits or grooves, so that accurate tracking error detection can be performed.

Still another object of the present invention, is to provide a system wherein high positioning accuracy as required in the sampling method is not necessary in positioning one sample pit in relation to another sample pit, resulting in a low production cost.

A further object of the present invention is to provide a system where not only extension of recording bits out of recording grooves caused by variations in the recording apparatus is prevented so as to uniformly maintain the size of the recording bits aligned on a recording groove, but also reduction of the occurrence of crosstalk thereby improving signal quality.

An optical recording element according to this invention for accomplishing the above objects is designed to have an information recording area formed in every recording unit in a non-continuous and discrete condition and its driving system is designed to irradiate a light beam precisely on the above non-continuous recording area.

In the above arrangement, recording and erasing of information can be checked for rendering a light beam to be precisely irradiated on a non-continuous area constituting a recording unit, whereby operations such as recording (erasing) and retrieval can be accurately performed.

An alternative optical recording element according to the present invention is characterized in that the width of a recording film constituting a recording area is limited to a size equal to the diameter of the recording bit. More particularly, each recording film has a length, in a direction perpendicular to the track direction, equal to the diameter of the recording bit spaced apart a distance equal to the spacing between the recording bits.

In the use of an optical recording element having the above arrangement, not only extension of the recording bits out of the recording grooves due to the variations in the recording power of recording apparatus can be prevented but also recording bits aligned on the recording grooves are set to be uniform thereby reducing the occurrence of crosstalk and improving signal quality.

Another alternative optical recording element according to this invention is characterized in that sample pits are disposed at intervals of a fixed distance in the access direction of a light beam on a substrate and at least one of these tracking error detection sections which constitute the sample pit is inclined with respect to the access direction of the light beam. In the above arrangement, when the sample pit comprises two tracking error detection sections, the time lag between the generation of a read out signal at one of the tracking error detection sections and the generation of a read out signal at the other tracking error detection section, are caused by the access of the light beam. In other words the phase difference between the pair of tracking error detection sections is varied in accordance with the displacement amount of the access position of the light beam from the center of the track in a direction perpendicular to the track direction. A tracking error can be accordingly detected by obtaining the phase difference between read out signals respectively generated from the pair of tracking error detection sections.

In this case, a non-separate photodetector instead of a two-element photodetector can be used as a photodetector so that the incline of the substrate does not so adversely affect the tracking error detection signals even if the substrate is inclined. Since a tracking error is detected in accordance with the phase difference between read out signals from the sample pit, even if the tracking error detection sections constituting the sample pit are formed of pits, grooves, or the like, the influence of the variation in the widths, depths, etc. of the pit/groove-type tracking error detection sections will be reduced whereby accurate tracking error detection can be performed. Furthermore, although it is necessary to accurately determine the relative positions of the tracking error detection sections which constitute the sample pit, such accuracy is not required in the positioning of one sample pit in relation to another sample pit as required in the aforementioned sampling method. This can be an advantage in manufacturing an optical recording device at low cost.

Another alternative optical recording element according to this invention is characterized in that an information recording area is formed in every recording unit in a non-continuous and discrete condition, and its driving system is characterized in comprising means for carrying out the following processes during the time a light beam passes through a non-continuous recording area: (i) erasing information, recorded in the non-continuous recording area or information therein, by the varying output of the light beam; and (ii) verifying whether the recording/erasing has been correctly performed.

In the above arrangement, information recording/erasing and its check have been done within the time that the light beam passes through one non-continuous recording area, so that there is no need to wait for the optical disk to rotate, thereby saving a significant amount of time required for recording/erasing operation and its check.

These and other objects and features of the present invention will be more apparent from the following descriptions taken in conjunction with the accompanying drawings.

BRIEF DESCRIPTION OF THE DRAWINGS

FIGS. 1 to 21 relates to the present invention.

FIG. 2 is a diagram showing the intensity distribution of a laser beam.

FIG. 5 is a view showing an example of the structure of a magneto-optical film employed in the present invention.

FIG. 6 is an exemplary view showing one embodiment of an optical recording element of the present invention.

FIG. 7 is a block diagram showing the structure of a preferred embodiment of the present invention.

FIG. 10 is a partial plan view of the optical recording element.

FIG. 11 is a waveform chart showing the waveforms of signals respectively generated when the light beam scans in the directions A, B and C of FIG. 10.

FIG. 12 is a block diagram showing the structure of a circuit for reading information.

FIG. 13 is a schematic front view showing a substrate of the optical recording element.

FIG. 14 is a timing chart showing the time lag between the generation of a read out signal at a reference pit and the generation of a read out signal at an inclined pit.

FIGS. 15 and 16 are views respectively showing another example of the inclined pit.

FIG. 18(a) is a schematic front view showing two pits used as the tracking error detection sections, and FIG. 18(b) is a graph showing a change in the intensity of a read out signal generated when the light beam passes through two pits.

FIG. 20 is a block diagram showing the structure of the circuit of a driving system for the optical recording element.

FIG. 21 is a waveform chart showing the waveforms of signals respectively generated in the sections of FIG. 20.

FIG. 22 is a sectional partially enlarged view of an optical recording element in a prior art.

FIG. 23 is a schematic view showing the relationship between a recording groove and pits which provide address information about a track.

FIG. 24 is a view showing a converted optical recording element in which a recording film is heated too high due to the excessive recording power of a laser beam resulting in a recording bit extending outside the guiding groove.

FIG. 25 is a schematic view showing the structure of a prior reading device.

FIG. 26 is a schematic plan view showing a substrate in another prior art device.

FIG. 27 is a timing chart showing the amplitude of a read out signal from a pit for tracking error detection in the prior art of FIG. 26.

FIG. 28 is a schematic view of the structure of a reading device in the prior art of FIG. 26.

DESCRIPTION OF THE EMBODIMENTS

The following description will describe the present invention in detail with reference to FIGS. 1 to 21 of the accompanying drawings.

Figure 1A:
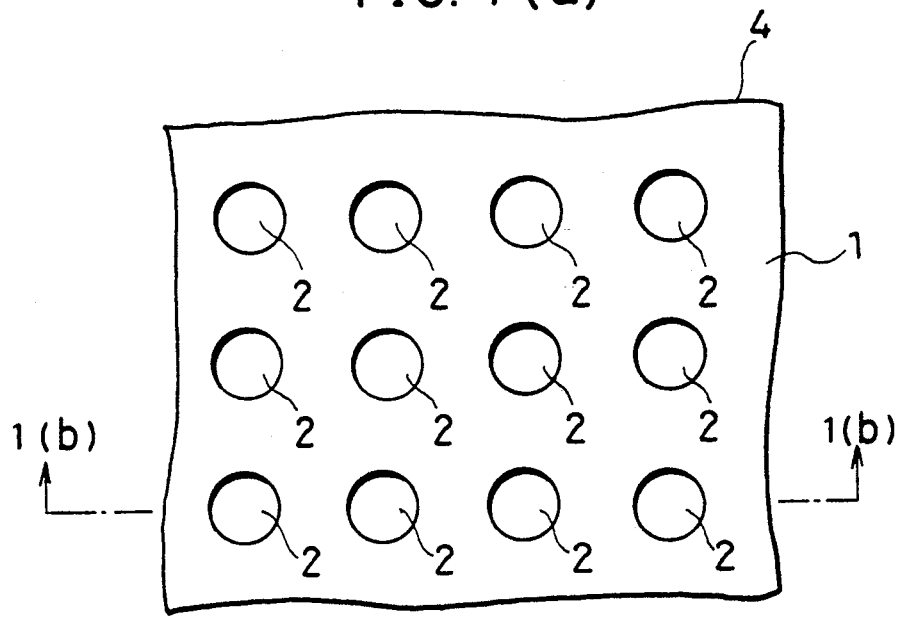
FIG. 1(a) is a plan view of a magneto-optical recording element.
Figure 1B:
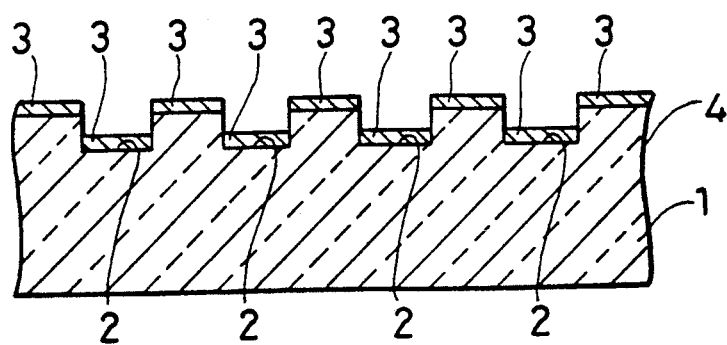
FIG. 1(b) is a sectional view taken along the line X—X of FIG. 1(a).

In this description, a magneto-optical recording element 4 is used as one example of an optical recording element. As shown in the sectional partially enlarged view of FIG. 1(b), the magneto-optical recording element 4 comprises recording pits 2 (hereinafter referred to as pits 2). As shown in FIG. 1(a), the pits 2 formed on one surface of a transparent substrate 1 made of glass or the like, each pit 2 having the same size as that of a recording bit. Provided on the transparent substrate 1 are recording films 3 each of which comprises a magnetic film having a thickness less than the depth of the pit 2.

In this arrangement, a series of recording films 3 is designed to be non-continuous so that recording bit areas (i.e. pits 2) and areas other than the recording bit areas (i.e. guiding grooves) each have a discrete and independent recording film 3. This prevents a bit recorded in the pit 2 from extending outside the pit 2, thereby improving signal quality without crosstalk.

Figure 2:
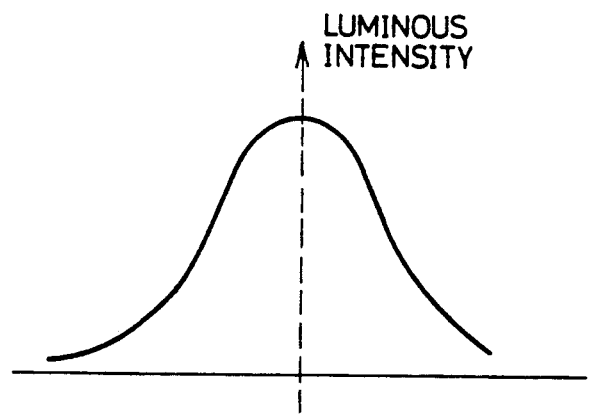
Figure 3A:
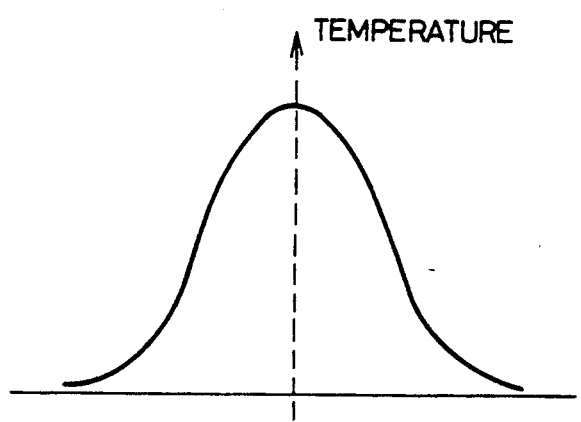
FIGS. 3A and 3B show a diagram showing the temperature distribution of a recording film.
Figure 3B:
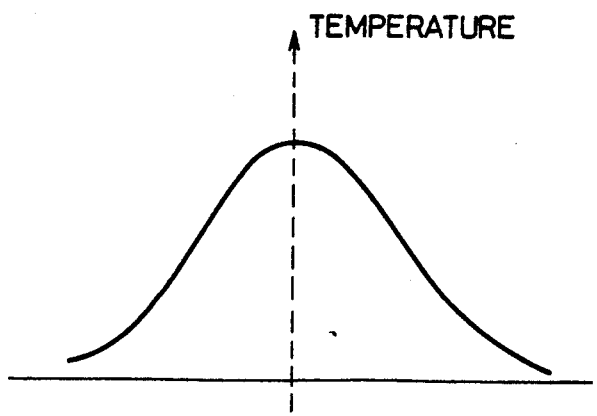
Figure 4A:
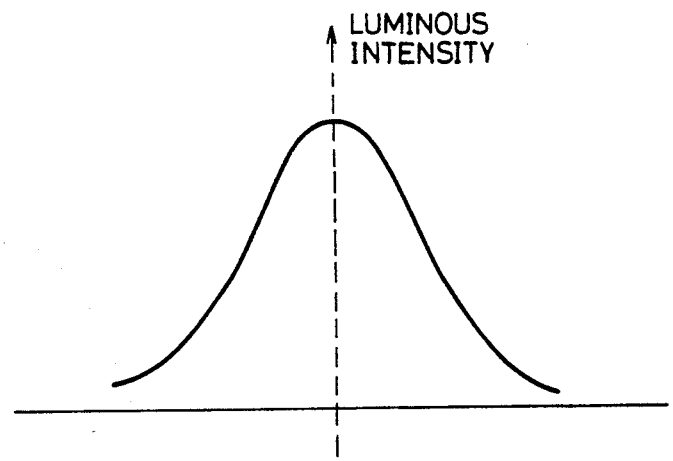
FIGS. 4a and 4b show a diagram showing an effect of the present invention wherein in the vicinity of a pit, irregular temperature distribution can be obtained and information can be recorded at more than a predetermined temperature.
Figure 4B:
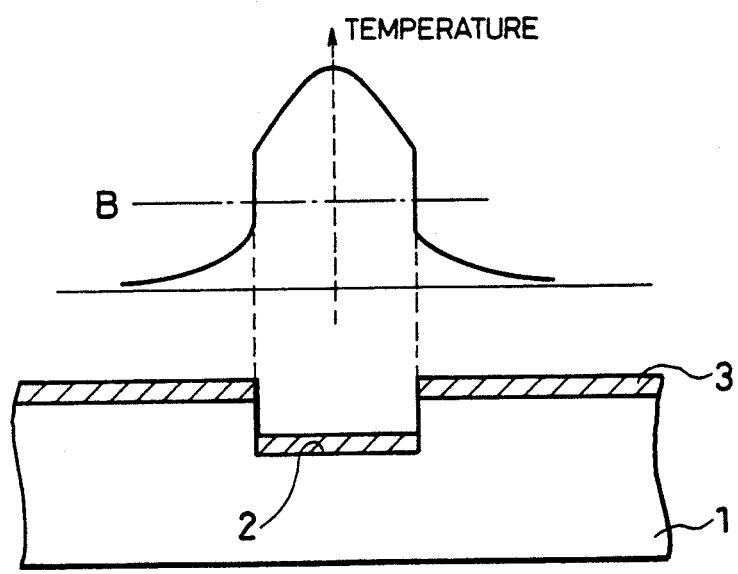

Generally speaking, when a semi-conductor laser beam used for optical recording is focused by an objective lens, luminous intensity distribution similar to the Gaussian distribution shown in FIG. 2 is obtained. When a light beam having such luminous intensity distribution is irradiated on a recording film, the temperature distribution of the recording film becomes temporarily similar to the above luminous intensity distribution (e.g. the temperature distribution shown in FIG. 3(a)), and gradually widens (see FIG. 3(b)) as time elapses, due to the heat transmission of the recording film. In contrast, when using the optical recording element of the invention having the recording film 3 which is discrete and formed within the ridge of the pit 2, heat is prevented by the wall portion which exists between the pit 2 and the guiding groove from extending outside the pit 2. For example, even if a light having the luminous distribution shown in FIG. 4(a) is irradiated, the temperature distribution in the neighborhood of the pit 2 will be irregular as shown in FIG. 4(b). This shows that the recording area (i.e. recording bit area) will not extend outside the pit 2 when employing a recording film in which information cannot be recorded at a temperature lower than the temperature B shown in FIG. 4(b).

As described above, this invention is particularly useful in recording performed by heating a recording information film to a temperature higher than a specified threshold by a converged light beam, and can be used in magneto-optical recording and recording where the phase transition of crystal/non-crystal states is utilized.

Figure 5:
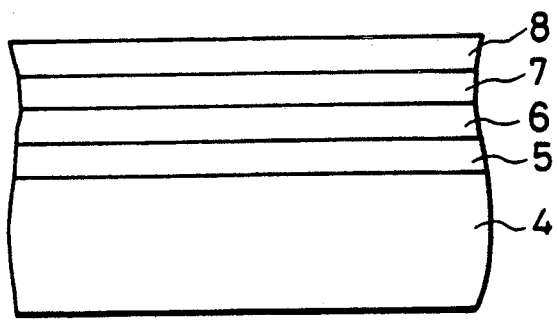

As shown in FIG. 5, the recording film 3 shown in FIG. 1 comprises a four-layer magnetic film formed thereon including: a first nitrogen compound layer 5 formed of SiN or the like; a magnetic film 6 formed of GdTbFe, TbFeCo, GdNdFe or the like; a second nitrogen compound layer 7 formed of SiN or the like; and a reflective film 8 formed of Al, Ta, Ti or the like. This four layer structure is very effective since it enables production of a thin magnetic film with shallow pits engraved on the subtrate 1. For example, the magnetic layer 6 in the above four-layer-structure has a thickness preferably in the range of 150 Å to 300 Å and in this case, the depth of the pits may be more than 300 Å.

An etching method as disclosed in Japanese publication for unexamined patent application (No. 210547/1984) is suitable for manufacturing the substrate having pits as disclosed in this invention, and particularly anisotropic etching such as reactive ion etching is effective since the end face of the pit is rendered to be substantially normal to the substrate.

Figure 6:
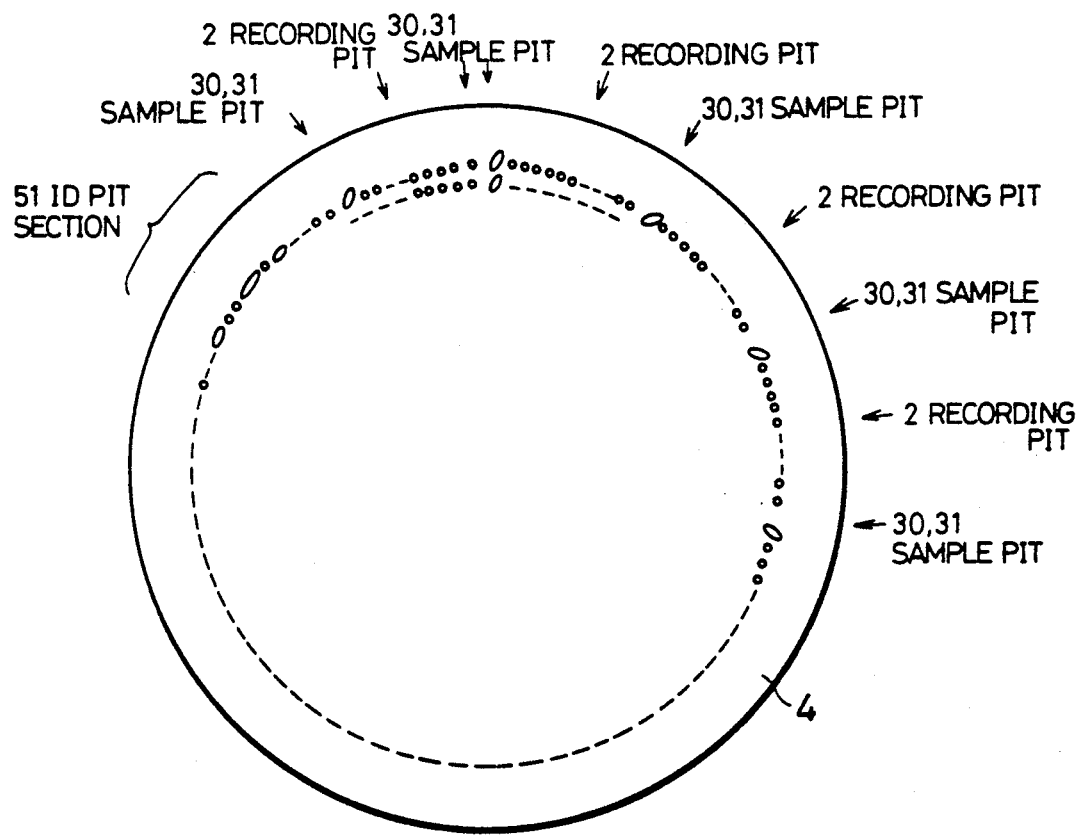

In the present invention, a magneto-optical recording element having recording areas each of which is formed in a non-continuous condition in every recording unit (i.e. a bit). FIG. 6 shows an exemplary arrangement of the pits in the magneto-optical recording element of the invention.

Figure 7:
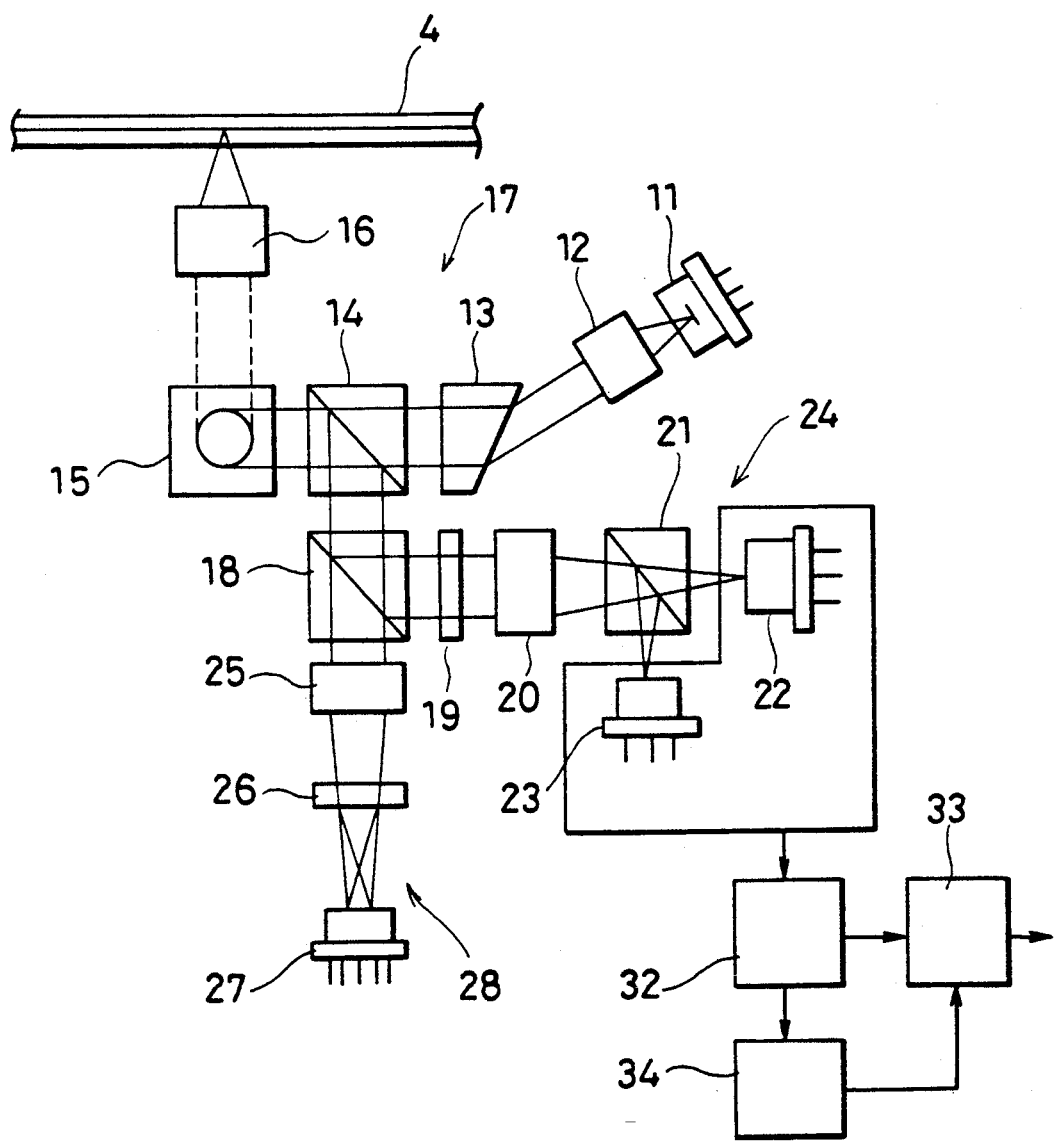

As shown in FIG. 7, the driving system of the present invention comprises a first optical system 17 for guiding a semi-conductor laser beam to the magneto-optical recording element 4. The optical system 17 includes a semi-conductor laser 11, collimating lens 12, shaping prism 13, beam splitter 14, mirror 15 and objective lens 16. A second optical system 24 is used for detecting a reflected light from the magneto-optical recording element 4 in order to read information. The second optical system 24 includes a beam splitter 18, ½ waveform plate 19, focusing lens 20, beam splitter 21 and PIN photodiodes 22 and 23. A third optical system 28 detects a reflected light from the magneto-optical recording element 4 for sending a focusing servo and tracking servo signal. The third optical system 28 comprises a focusing lens 25, cylindrical lens 26 and PIN photodiode for a servo 27.

The retrieval of a magneto-optical signal is carried out by detecting the difference between the outputs of the PIN photodiodes 22 and 23. For instance, a change in the polarizing direction (the Kerr rotation angle) of a reflected light, which corresponds to the direction of the magnetization of the recording film 3 is detected by determining the difference between the respective intensities of the reflected lights incident on the PIN photodiodes 22 and 23 which are positioned on two different axes.

Also, the sum of the outputs of the PIN photodiodes 22 and 23 is detected in order to detect the presence of the pits 2 by utilizing, for instance, a change in the total intensity of the light reflected at the pit 2, which is caused by light diffraction occurring due to the difference between the heights of the pit 2 and non-pit area. The semi-conductor laser 11 emits the pulsed light beam (shown in FIG. 8(a)) to be irradiated on the magneto-optical recording element 4 so that three pulses correspond to one pit 2 (see FIG. 8(b) where the magneto-optical element 4 is depicted in conjunction with FIG. 8(a)). Considering FIGS. 8(a) and 8(b) collectively, pulses a, b and c correspond to a pit 2a having a recording film 3a which is magnetized in the positive direction (i.e. initial direction) and pulses d, e and f correspond to a pit 2b having a recording film 3b magnetized in the opposite direction.

According to the foregoing arrangement, in the sum signals of the outputs of the PIN photodiodes 22 and 23 which correspond to the pulsed light beams, the outputs of pulses $a_1$, $b_1$, $c_1$; $d_1$, $e_1$, $f_1$ respectively corresponding to the pulses a, b, c; d, e, f are lower than those of the pulses a, b, c; d, e, f to some extent, as shown in FIG. 8(c). The presence of the pits 2 can be detected by detecting the sum signal.

On the other hand, in the difference signals of the outputs of the PIN photodiodes 22 and 23 which correspond to the pulsed light beams, the outputs of pulses $a_2$, $b_2$, $c_2$ respectively corresponding to the pulses a, b, c are lower further than those signals of the pulses a, b and c, and pulses $d_2$, $e_2$, $f_2$ (respectively corresponding to the pulses d, e, f) are positive when the latter are negative, and vice versa. As apparent from the above description, not only pit signals and magneto-optical signals can be separately taken out, but also a magneto-optical signal having the pulses $a_2$, $b_2$, $c_2$ can be distinguished from other magneto-optical signals having the pulses $d_2$, $e_2$, $f_2$. Such an arrangement enables the recording of information on the magneto-optical element 4.

Figure 9A:
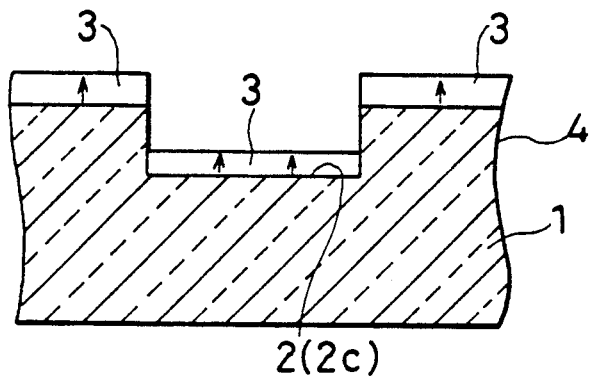
FIG. 9(a) is a sectional view of the magneto-optical recording element.
Figure 9B:
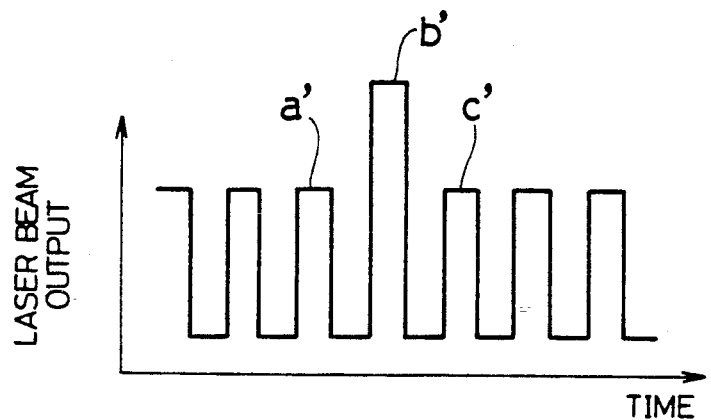
FIG. 9(b) is a timing chart showing the output of the laser beam to be irradiated in conjunction with FIG. 9(a).
Figure 9C:
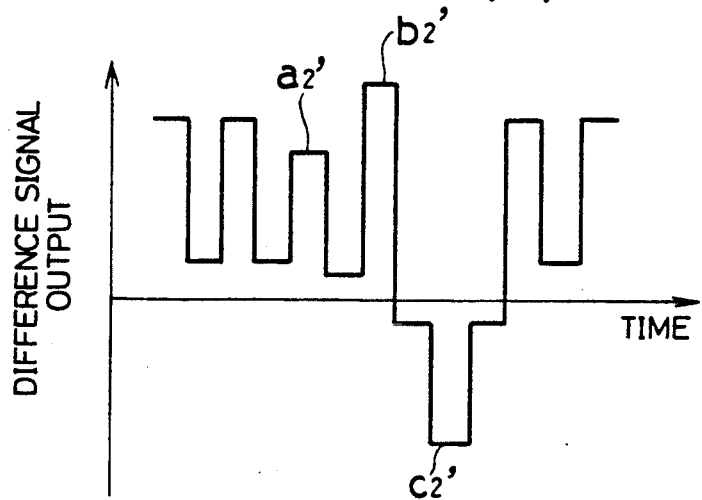
FIG. 9(c) is a timing chart of a difference signal which indicates the difference between the outputs of the two PIN photodiodes.

When recording information on the magneto-optical recording element 4, or erasing information stored therein, the operations have to be executed after checking the recording condition of the recording film 3 formed on the pit 2 in which information is to be recorded or from which information is to be erased. The pulses a and d are used in the above check. With reference to FIGS. 9(a)-(c), of the three pulses a', b', c' (these are the pulses of the irradiated laser beam) which correspond to the pit 2c shown in FIG. 9(a), the pulse a' is used.

If the pit 2c is in a non-recording state, the pulse $a_2$' corresponding to a' becomes positive like other pulses as shown in FIG. 9(c). The recording condition of the recording film 3 on the pit 2c is checked by detecting this pulse $a_2$'. If the pit 2c is in a non-recording state unexpectedly, the output of the next pulse b' is increased thereby raising the temperature of the recording film 3 on the pit 2c in order to decrease the coercive force of the recording film 3 and reverse the direction of the magnetization. Information recording is thus performed. The above recording is checked by the next pulse c' (the output of the pulse c' is the same as that of the pulse a'). In the above case, the pulse $c_2$' corresponding to the pulse c' becomes negative as shown in FIG. 9(c) thereby indicating that the pit 2c is in a recording state. Thus, the direction of the magnetization of the recording film 3 on the pit 2 is detected by detecting whether the the pulse $c_2$' is negative or positive.

As described above, information recording/erasing and its check can be performed while a light beam passes through one non-continuous area (one recording unit), so that there is no need to wait for the optical disk to rotate unlike the conventional case. Therefore, a significant amount of time required for information recording/erasing and its check can be saved in total.

If it is judged by detecting the pulse $a_2$' that the recording film 3 on the pit 2c is in an expected state, the output of the next pulse b' may be the same as that of the pulse a'. In other words, since the direction of the magnetization of the recording film is detected beforehand by detecting the pulse $a_2$' in this embodiment, the recording/erasing operation on the recording film 3 on the pit 2 can be omitted if it is judged that the above pit 2 is in an expected state.

In the use of the optical recording element and its driving system of the present invention, the recording of information on the non-continuous area with a light beam which is varied as required and the verification whether the recorded information is correct, are performed within the time that the light beam passes through one non-continuous area. The aforementioned pulsed light beam is constituted by a pulse for detecting the direction of the magnetization; a pulse for reversing the direction of the magnetization; and a pulse for checking the direction of the magnetization. The number of pulses corresponding to each pit 2 is not limited to three but may be more than three. For example, by employing a pulsed light beam having five pulses, the following steps may be taken during the time required for the light beam to pass through one pit 2: i) detecting the direction of the magnetization; ii) reversing the direction of the magnetization; iii) checking the direction of the magnetization; iv) reversing the direction of the magnetization; v) checking the direction of the magnetization. With this arrangement, if is is judged in step iii that the direction of the magnetization is in an unexpected state, the direction of the magnetization can be changed by reversing the direction of the magnetization in the next step iv.

In the use of the aforesaid driving system used for the optical recording element having an information recording area formed in every recording unit in a non-continuous condition, even if a laser beam is irradiated on the recording film with its center which gets out of the center position of the non-continuous area more or less when recording information on said area (the recording film 3 on the pit 2 in this embodiment), the temperature of the non-continuous area will be increased with little change in the temperature distribution thereat. Since the heat in other areas than the non-continuous area easily disperses, a big difference occurs between the temperatures of the two areas. With the effect of this, the direction of the magnetization is reversed only in the non-continuous area, and the reversion does not occur outside the non-continuous area. Thus, the problems with conventional systems such as the occurrence of crosstalk can be overcome.

The magneto-optical recording element 4 has non-continuous information recording areas each of which has a recording film 3 and is defined by the level of the pits which is different from that of other areas. FIG. 6 shows the whole pit arrangement of the magneto-optical recording element 4. This magneto-optical recording element 4 comprises not only the above described pits which are disposed in the recording units (i.e. recording pits) but also a plurality of pits (i.e. sample pits)

for providing basic information from which the locations of the recording units can be obtained. Each sample pit is disposed next to the sequence of recording pits, comprising reference pits and an inclined pit. The spacing between the reference pit and the inclined pit (unique distance) differs from the spacing between the adjacent recording pits. The sample pits are disposed at intervals of a fixed distance in the magneto-optical element 4.

Figure 10:
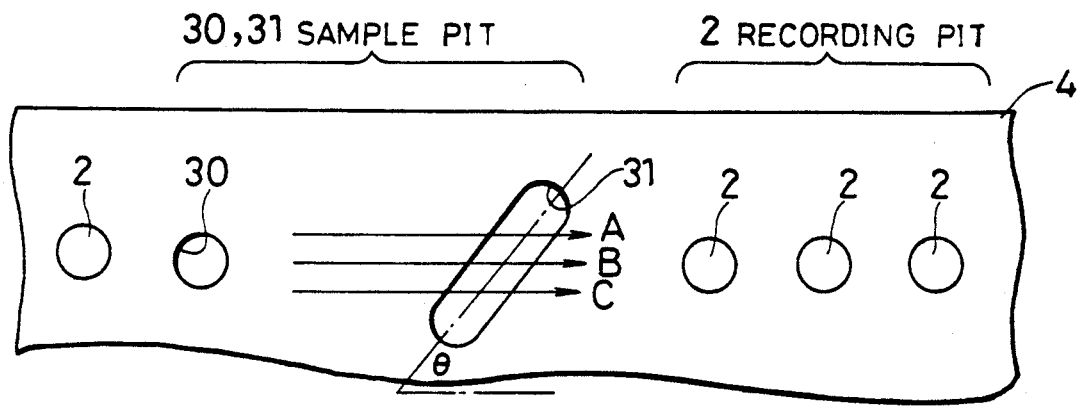
Figure 11:
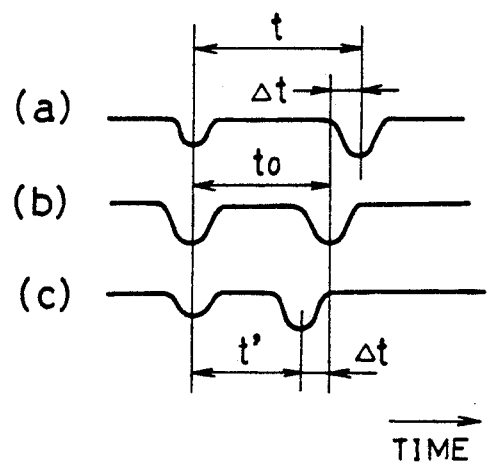

The following description will discuss the sample pits shown in FIG. 6 with reference to FIGS. 10 and 11.

As shown in FIG. 10, the magneto-optical recording element 4 comprises thereon a plurality of recording pits (data pits) 2 formed along the center of the track indicated by arrow B and a reference pit 30 of a substantially round shape interposed between the recording pits 2 at the center of the track. This reference pit is used as one of the pair of tracking error detection sections.

An elongated inclined pit 31 used as the other tracking error detection section is placed at a predetermined distance apart from the reference pit 30 in the access direction of the light beam that is the track direction. The inclined pit 31 is disposed in the form of a groove inclined at the angle $\theta$ with respect to the access direction of the light beam (i.e. the track direction). The inclined pit 31 extends in a direction perpendicular to the track direction where the center of the track indicated by arrow B as a center.

With the arrangement described above, when the light beam from the reading device (described later) accesses the center of the track along the direction of arrow B, the time lag between the generation of a read out signal at the reference pit 30 and the generation of a read out signal at the inclined pit 31 becomes $t_0$ as shown in FIG. 11(b).

When the light beam accesses along the direction indicated by arrow A, this direction being shifted a predetermined distance apart from the center line of the track in a perpendicular direction to the track direction, the time at which a read out signal is generated from the reference pit 30 is the same as that in the case the light beam accesses the center of the track as shown in FIG. 11(a), but the time at which a read out signal is generated from the inclined pit 31 is later than that in the above mentioned case. As a result, the time lag t between the generation of a read out signal at the reference pit 30 and the generation of a read out signal at the inclined pit 31 becomes longer than the time lag $t_0$ by $\Delta t$.

When the light beam accesses along the direction indicated by arrow C, the direction being shifted the aforesaid predetermined distance apart from the center line of the track in the opposite direction to the direction indicated by arrow A, the time at which a read out signal is generated from the inclined pit 31 is earlier than that in the case the light beam accesses the center of the track, and the time lag t' between the generation of a read out signal at the reference pit 30 and the generation of a read out signal at the inclined pit 31 accordingly becomes shorter than the time lag $t_0$ by $\Delta t$.

The direction in which the light beam is shifted from the center of the track can be obtained by judging whether the time lag between the generation of a read out signal at the reference pit 30 and the generation of a read out signal at the inclined signal 31 is longer or shorter than the time lag $t_0$, in other words, by detecting the phase difference between the read out signals generated from the reference pit 30 and the inclined pit 31.

Also, the displacement amount of the light beam from the center of the track can be obtained by detecting the difference between the actual time elapsed after a read out signal is generated from the reference pit 30 until a read out signal is generated from the inclined signal 31 and the time lag $t_0$ caused in the case the light beam accesses the center of the track.

The following description will describe the reading device for reading out information from the optical recording element 4.

Figure 12:
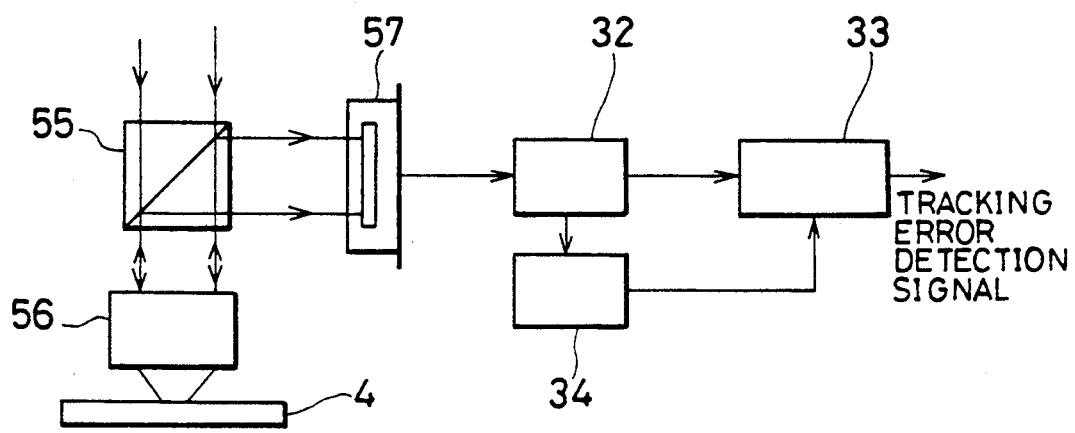

In the arrangement shown in FIG. 12, tracking error detection is accomplished by the following procedures. A light beam emitted from a laser beam source (not shown) is irradiated on the magneto-optical element 4 through a half mirror 55, and objective lens 56. Reflected light beams from the reference pit 30 and inclined pit 31 (both pits are not shown) formed on the magneto-optical recording element 4 are successively projected back to the photodetector 57 through the objective lens 56 and half mirror 55. Thereafter, signals respectively corresponding to the reflected light beams of the reference pit 30 and inclined pit 31 are generated from the photodetector 57 and then successively entered in a time lag detector 33 after passing through a waveform shaping circuit 32. Then, in accordance with a timing signal from a timing signal generator 34, the time lag between generation of a read out signal at the reference pit 30 and the generation of a read out signal at the inclined pit 31 is detected by the time lag detector 33, thereby obtaining a tracking error detection signal.

Another example of the sample pit will be explained hereinbelow with reference to FIGS. 13 to 16.

Figure 13:
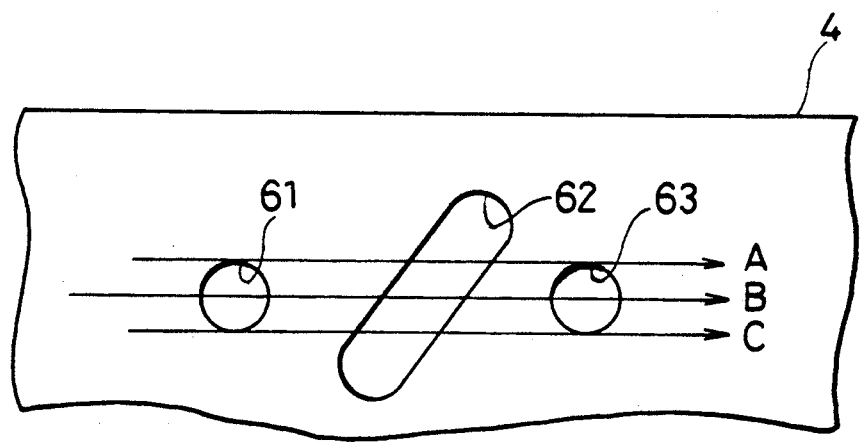
Figure 14:
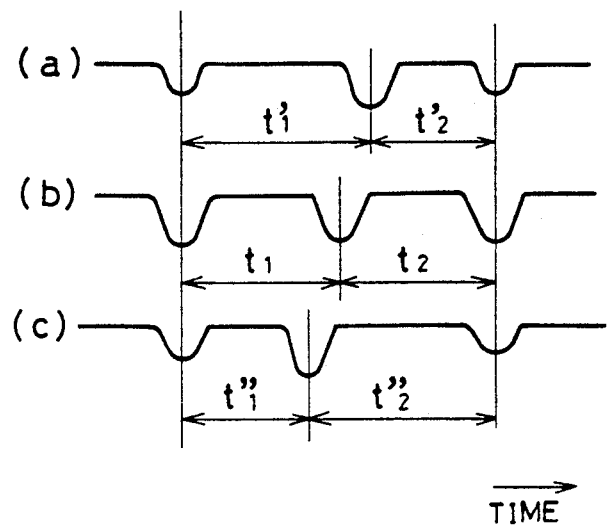

As shown in FIG. 13, the magneto-optical recording element 4 has thereon a first reference pit 61 and inclined pit 62 as one of the tracking error detection sections. This magneto-optical recording element 4 also has a second reference pit 63, as the other tracking error detection section, disposed behind the inclined pit 62 viewing in the access direction of the light beam. The spacing between the second reference pit 63 and the inclined pit 62 is equivalent to that between the first reference pit 61 and the inclined pit 62.

In the use of this sample pit, a comparison is made between the time lag between the generation of a read out signal at the first reference pit 61 and the generation of a read out signal at the inclined pit 62 and the time lag between the generation of a read out signal at the inclined pit 62 and the generation of a read out signal at the inclined pit 63, thereby detecting a tracking error.

More specifically, when the light beam accesses the center of the track indicated by arrow B, the time lag $t_1$ between the generation of a read out signal at the first reference pit 61 and the generation of a read out signal at the inclined pit 62 becomes equivalent to the time lag $t_2$ between the generation of a read out signal at the inclined pit 62 and the generation of a read out signal at the second reference pit 63, as shown in FIG. 14(b).

In contrast, when the light beam accesses the track along the direction indicated by arrow A which is shifted from the center of the track in a perpendicular direction to the track direction, the time lag $t_1'$ between generation of a read out signal at the first reference pit 61 and generation of a read out signal at the inclined pit 62 becomes longer than the time lag $t_2'$ between the generation of a read out signal at the inclined pit 62 and the generation of a read out signal at the second reference pit 63, as shown in FIG. 14(a).

When the light beam accesses the track along the direction indicated by arrow C which is shifted from the center of the track in the opposite direction to the direction of arrow A, the time lag $t_1''$ between the generation of a read out signal at the first reference pit 61 and the generation of a read out signal at the inclined pit 62 becomes shorter than the time lag $t_2''$ between the generation of a read out signal at the inclined pit 62 and the generation of a read out signal at the second reference pit 63, as shown in FIG. 14(c).

Figure 15:
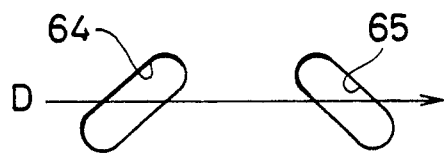

In the foregoing embodiments, one or a plurality of reference pits and one inclined pit are employed as the tracking error detection sections. However, it is also possible to employ a pair of inclined pits 64 and 65 as shown in FIG. 15, instead of the aforementioned reference pits 61 and 63, and inclined pit 62. This pair of pits 64 and 65 are inclined in opposite directions with respect to the access direction of the light beam indicated by arrow D. Tracking error detection may be performed in accordance with the time elapsed after a read out signal is generated from the inclined pit 64 until a read out signal is generated from the inclined pit 65.

Figure 16:
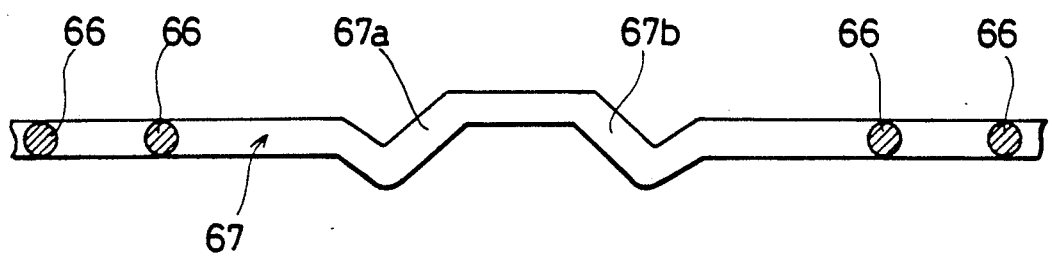

Likewise, a pair of inclined sections 67a and 67b shown in FIG. 16 may be disposed as the tracking error detection sections, on a groove 67 of the magneto-optical disk, this groove having recording bits 66 (indicated by the hatched portions of FIG. 16). These sections 67a and 67b are inclined in opposite directions, and tracking error detection can be accomplished based on the time lag between the generation of signals of the inclined sections 67a and 67b.

The following description will discuss the appropriate tilt angle of the inclined pit or groove to the access direction of the light beam, which is obtained by calculation.

Figure 17A:
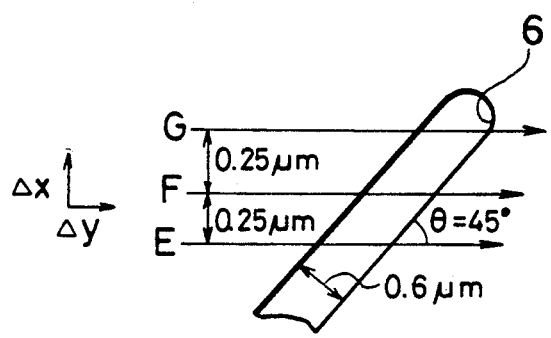
FIG. 17(a) is a schematic front view showing the inclined pit used as a tracking error detection section.
Figure 17B:
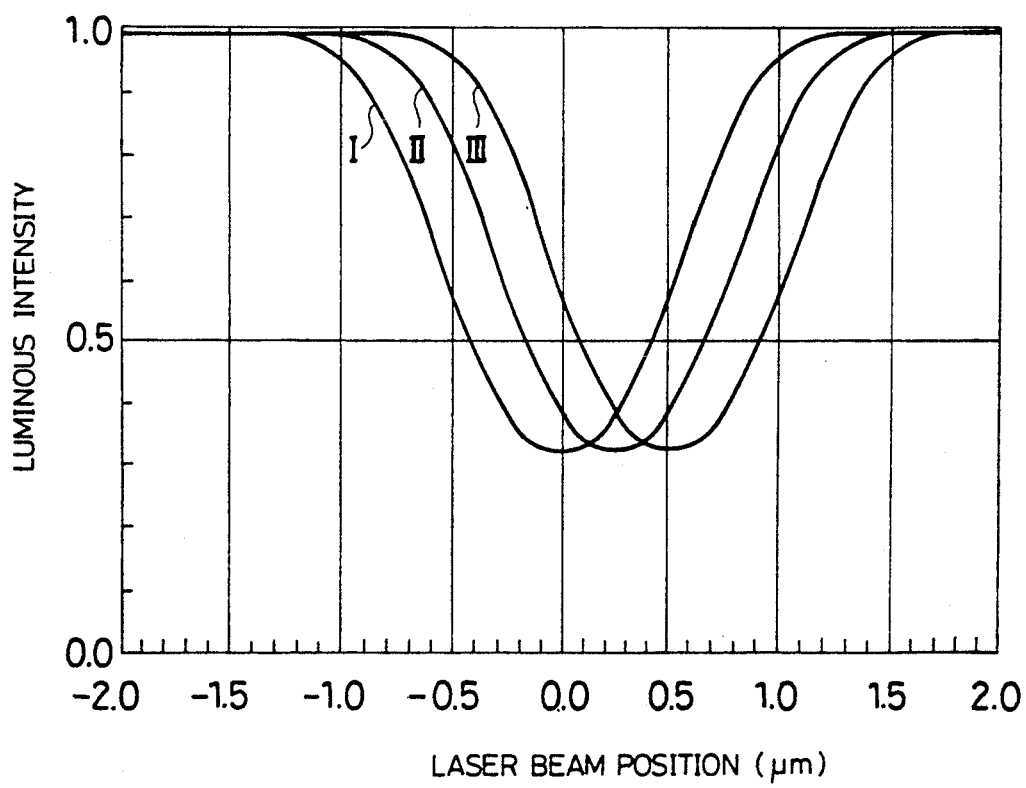
FIG. 17(b) is a graph showing a change in the intensity of a read out signal generated when a light beam passes through the inclined pit.
Figure 18:
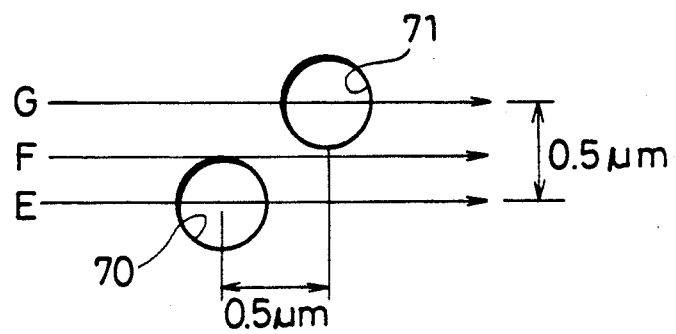
Figure 18:
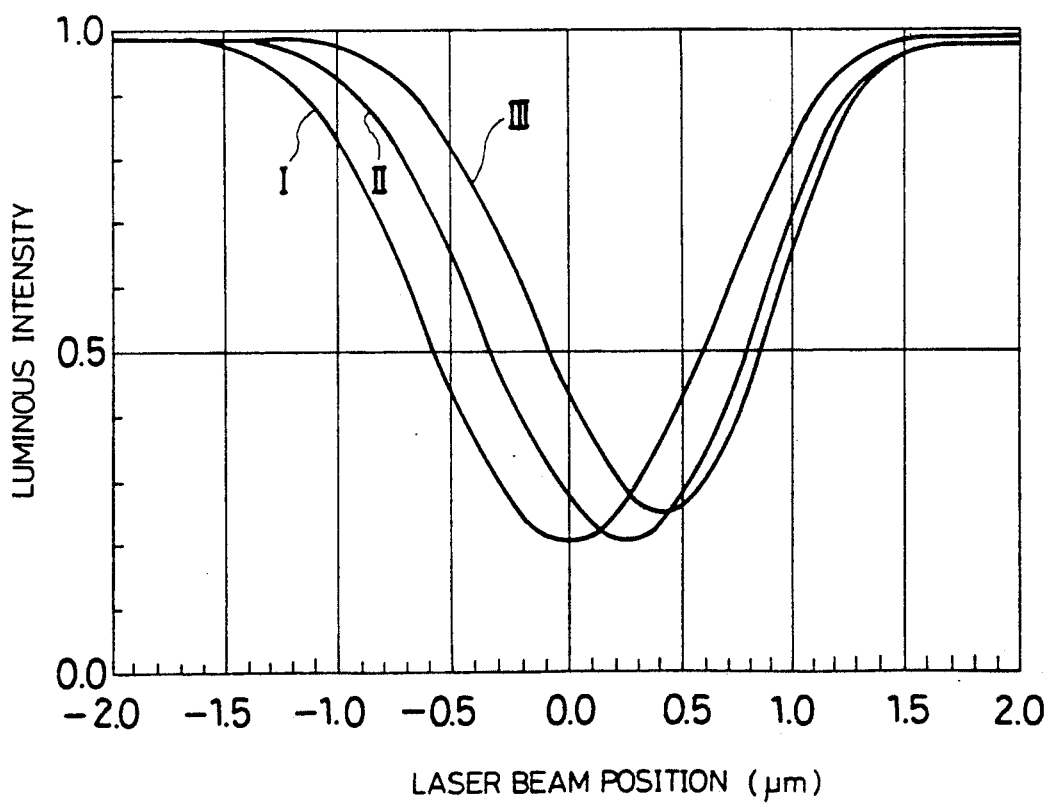

FIG. 17(b) shows a change in the intensity of the light beam which passes through the long sized inclined pit 68 shown in FIG. 17(a) having a width of 0.6 μm, a depth of 100 nm, and inclined at 45° with respect to the access direction of the light beam, i.e. the track direction. The above intensities were obtained by calculation. In FIG. 17(b), curved line I shows a change in the intensity of the light beam which passes through the center of the track along the direction of arrow E of FIG. 17(a); curved line II shows a change in the intensity of the light beam which passes along the direction of arrow F shifted by 0.25 μm from the center of the track in a vertical direction; and curved line III shows a change in the intensity of the light beam which passes along the direction of arrow G shifted by 0.5 μm from the center of the track in the same direction as arrow E. The luminous intensity plotted in the ordinate is a relative value.

It is apparent from FIG. 17(b) that the distance between the peak position of the intensity in curved line III and the peak position of the intensity in curved line I is 0.5 μm. The ratio of the displacement amount of the light beam in a direction perpendicular to the track Δyx to the displacement amount of the peak position of the intensity Δy is 1:1. In general, if the inclined pit 68 is inclined at an angle $\theta$ to the track, the following equation is obtained:

$$\Delta y/\Delta x = \cos\theta/\sin\theta$$

Since Δy/Δx is proportional to the detecting sensitivity of tracking error, the more the angle $\theta$ decreases, the more the sensitivity increases.

When the angle $\theta$ is small, the reproduced waveforms do not significantly differ from that of FIG. 17(b) except that the above waveforms widen in the abscissa direction. Therefore, the time constant in the differentiating circuit for detecting a peak position may be increased in proportion to $\cos\theta/\sin\theta$.

However, when the angle $\theta$ is excessively small, the inclined pit 68 becomes longer which reduces the data region. Therefore, the angle $\theta$ has a lower limit.

Generally, the number of pits for detecting a tracking error formed within one round of a disk track is in the range of 1,000 to 2,000. Accordingly, in a disk having a diameter of approximately 90 mm or 130 mm, the pits for detecting a tracking error are disposed at 80 μm to 150 μm intervals. Assuming that ten percent of the above length (i.e. 80 μm to 150 μm) of the track is used for detecting tracking errors, the length of the pit (or groove) for tracking error detection is 8 μm to 15 μm in the track direction. Hence, when the pitch of the track is set to 1.6 μm, the lower limit of the angle $\theta$ is in the range of 11° to 6.1°.

On the other hand, when the angle $\theta$ is large, the passing time of the light beam through the pit will generally decrease in the order of 1 μsec. In this case, accurate time measurement up to 1/20 μsec is required in order to limit a tracking error within one twentieth of the track pitch. For an angle 45°, the passing time of for light beam through the pit will be about 50 nsec. Hence, a maximum angle $\theta$ is 81.9° for incline is determined on the assumption that accurate time measurement can be practically perfomed up to 10 nsec. Consequently, the tilt angle $\theta$ of the inclined pit 68 is practically in the range of 6° to 80°.

In the foregoing case, the inclined pit 68 is used as one of the tracking error detection sections, but the pits shown in FIG. 18(a) may be adapted for detecting errors instead of the inclined pit 68. More specifically, these pits used as one of the tracking error detection sections are designed such that a pit 70 with a diameter of 0.6 μm and a depth of 100 nm is placed in the center of the track, and a pit 71 having the same diameter and depth as the pit 70 is placed 0.5 μm apart from the pit 70 both in the track direction and in one direction perpendicular to the track so that the line between the centers of the pits 70 and 71 defines a 45° angle with respect to the track. Another pit (not shown) having the same diameter and depth as the above two pits 70 and 71 is symmetrically placed with the pit 71 so that the pit 71 is spaced 0.5 μm apart from said pit both in the track direction and in a perpendicular direction to the track along the line between the centers of the pit 70. Said pit defines a 45° angle with respect to the track. It is proven by calculation that the above three pits exert the same effect as obtained when the inclined pit 68 is used.

Curved lines I, II and III of FIG. 18(b) respectively show i) a change in the intensity of the light beam which passes through the center of the track along the direction of arrow E of FIG. 18(a); ii) a change in the intensity of the light beam which passes along the direction of arrow F shifted by 0.25 μm from the center of the track in a direction perpendicular to the track; and iii) a change in the intensity of the light beam which passes along the direction of arrow G shifted by 0.5 μm from the center of the track in the same direction as arrow E. The waveforms illustrating the light intensities are similar to those shown in FIG. 17(b) associated with use to the inclined pit.

Figure 19A:
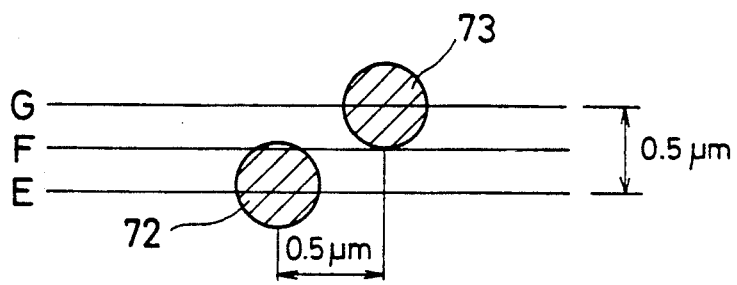
FIG. 19(a) is a schematic front view showing two bits used as the tracking error detection sections.

Instead of the pits 70, 71 and the other pit (not shown), the bits 72, 73 shown in FIG. 19(a) and another bit (not shown) may be used as one of the tracking error detection sections in an optical disk of a phase transition type wherein the quantity of reflected light varies depending on parts. The bit 72 is placed in the center of the track so that the line between the centers of the bits 72 and 73 defines a 45° angle with respect to the track.

Figure 19B:
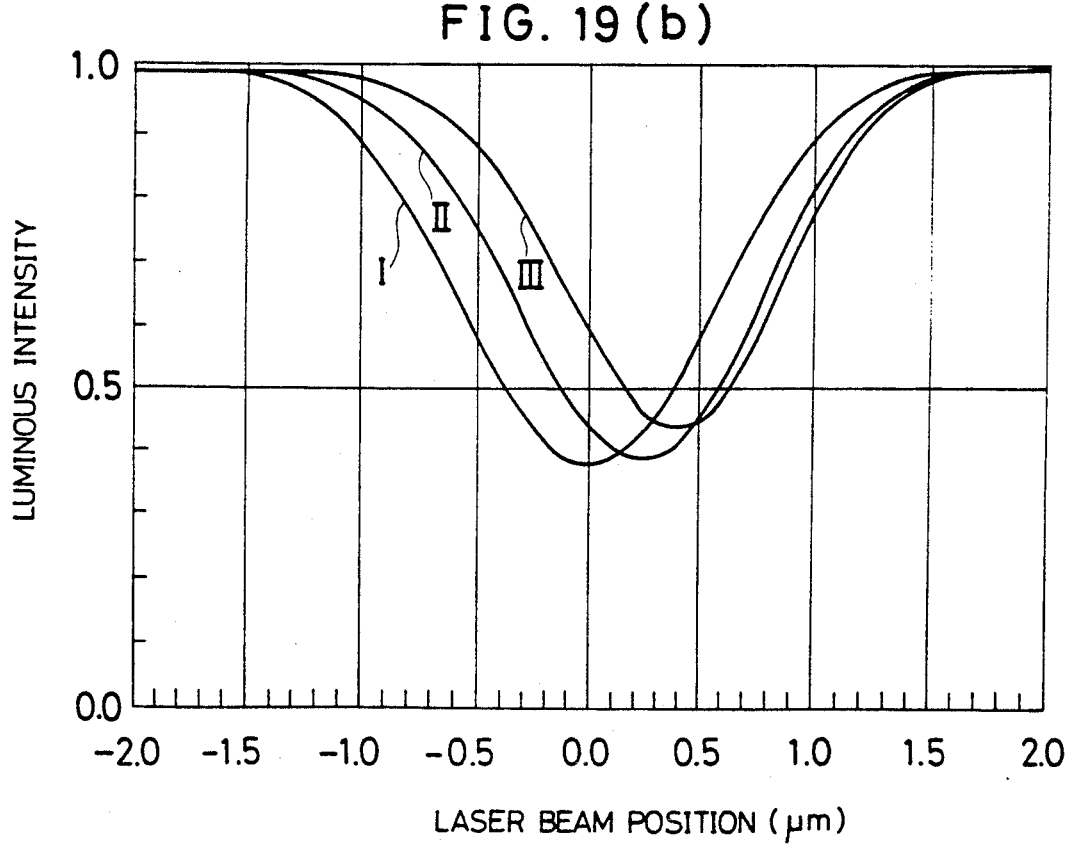
FIG. 19(b) is a graph showing the intensity of a read out signal generated when the light beam passes through two bits.
Figure 22:
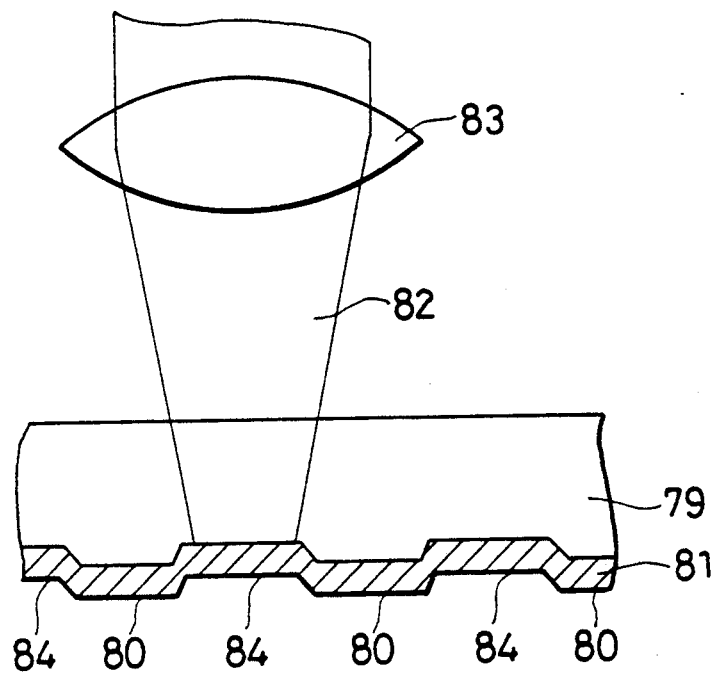
FIGS. 22 to 28 respectively show prior art systems.
Figure 23:
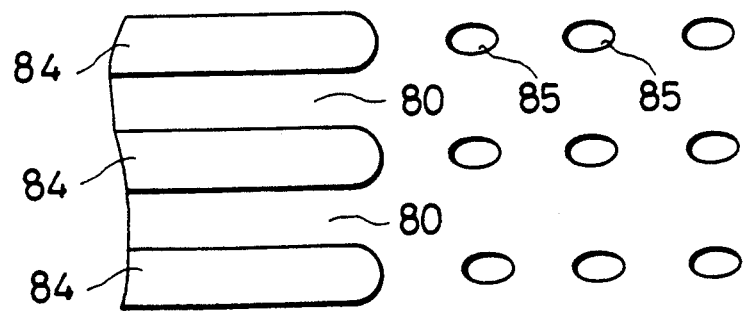
Figure 24:
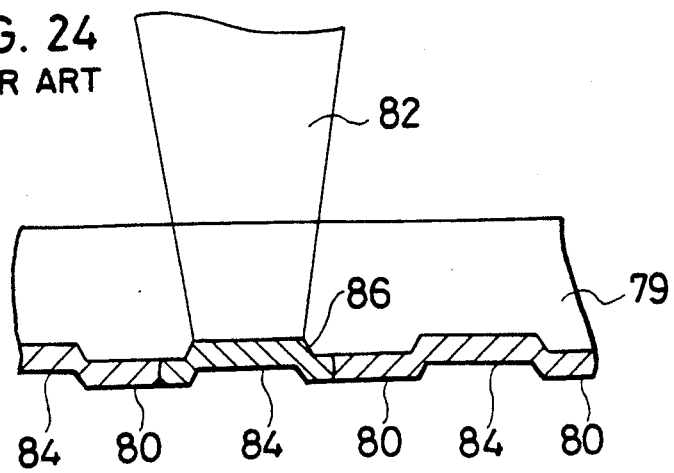
Figure 25:
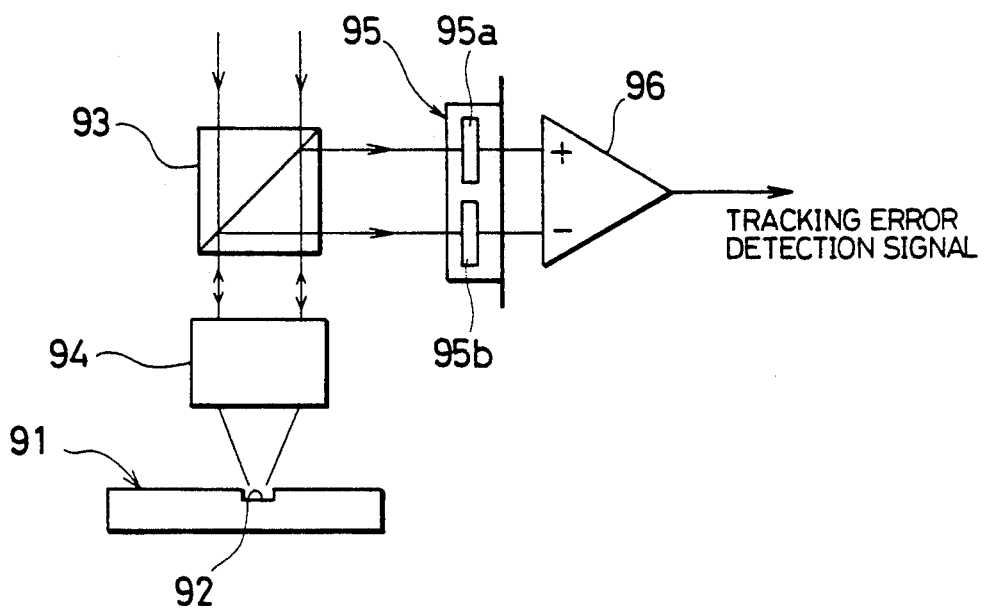
Figure 26:
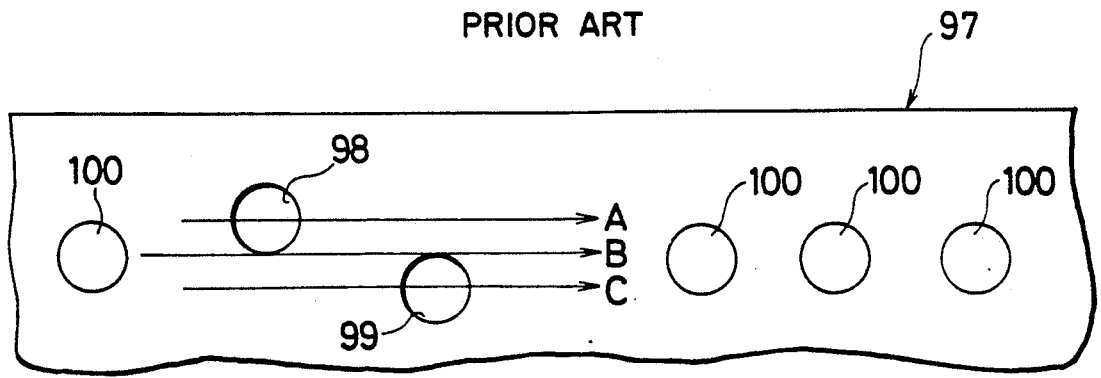
Figure 27:
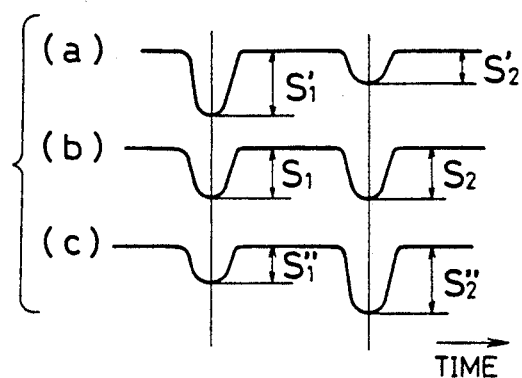
Figure 28:
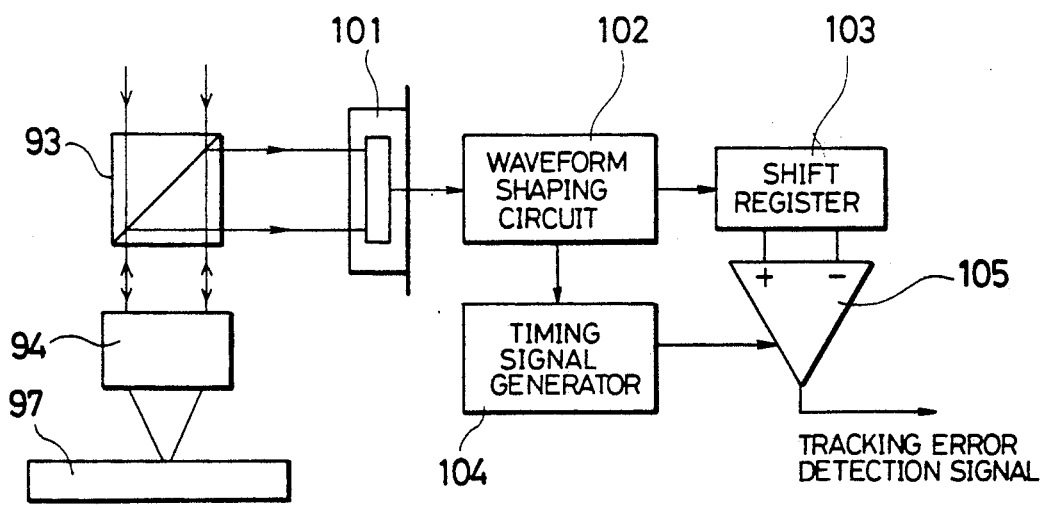

As shown in FIG. 19(b), the waveforms of light intensities are similar to those obtained where the pits 70, 71 and the other pit (not shown) are used. In the aforesaid optical disk of a phase transition type, the reflection rate in the bits 72, 73 and the other bit (not shown) is set to be "0" and the reflection rate in parts other than these bit areas is set to be "1". In the calculation applied to the above cases, the results of which are shown in FIGS. 17(b), 18(b) and 19(b), the wavelength of the light beam $\lambda = 780$ nm, numerical aperture NA=0.53, and the beam diameter=1.3 $\mu$m (the beam diameter is measured at the area where the luminous intensity is $1/e^2$ of the intensity at the center of the light beam).

The following description will discuss the servo patterns used for detecting the positions of the tracking error detection sections disposed on the optical recording element 4, which are composed of the above-described reference pits and inclined pit, or the inclined parts formed in the groove.

The reference pit 30 is spaced a predetermined distance (called as a unique distance) apart from the inclined pit 31 so that the time elapsed until the light beam reaches the inclined pit 31 after passing through the reference pit 30 can be fixed. More specifically, since the magneto-optical recording element 4 rotates at a regular speed (CAV), the physical distance between the reference pit 30 and the inclined pit 31 becomes narrower as it becomes closer to the center of the disk.

Next, the patterns for the sample pit used for detecting a tracking error in the sampling servo method will be explained. Generally, Four to Fifteen Modulation is utilized for recording data modulation. This modulation is used for changing a one byte (or 8 bits) code to 15 a channel bit code. In this modulation, the 15th bit is always "0", and the remaining 14 channel bits are divided into two groups, i.e., even-numbered bits and odd-numbered bits. The even-numbered bits and odd-numbered bits are respectively assigned to the four leftmost bits and the four rightmost bits. In both even-numbered bits and odd-numbered bits, two bits are always set to "1" and the remaining five bits "0".

Therefore, $_7C_2 = 7 \times 6 \div 2 = 21$ patterns are available in each group, i.e., even-numbered bits and odd-numbered bits, and $21 \times 21 = 441$ patterns are available in total, after the modulation. The original 8 bit code makes available $2^8 = 256$ patterns, so that $441 - 256 = 185$ patterns will be redundant. From the above redundant patterns, specified patterns are selected for the servo patterns for the sample pit. The servo patterns for the sample pit can be selected from the redundant patterns in the use of modulation methods other than the above described Four to Fifteen Modulation, since the patterns obtained by them always exceed the number of patterns obtained by the orignal bit code.

Another method of obtaining the servo patterns will be explained hereinbelow.

In order to easily read out the patterns after modulation, the modulation is generally not arranged so as to produce patterns such as "010101..." in which the pits are aligned at the shortest intervals. Patterns in which more than a prefixed number of "0"s or "1"s exist in sequence are also avoided.

Therefore, patterns in which more than the prefixed number of "0"s exist in sequence between two "1"s, such as "10000...01" can be used as the servo patterns for the sample pit. The aforesaid prefixed number of "0"s or "1"s means to a certain number of "0"s or "1"s allowed to exist in sequence when modulation is normally performed.

More specifically when using Four to Fifteen Modulation, patterns having about 16 to 19 "0"s in sequence are suitable for the servo patterns. In the use of Eight to Ten Modulations for changing 8 bit code to 10 bit code, no more than four "0"s or "1"s are allowed to exist in sequence so that patterns having five "0"s or more between "1"s are suitable for the servo patterns. Likewise, two to seven "0"s or "1"s are allowed to exist in sequence in Two to Seven Modulation, so that patterns having eight "0"s or more between "1"s are used as the servo patterns.

Figure 8A:
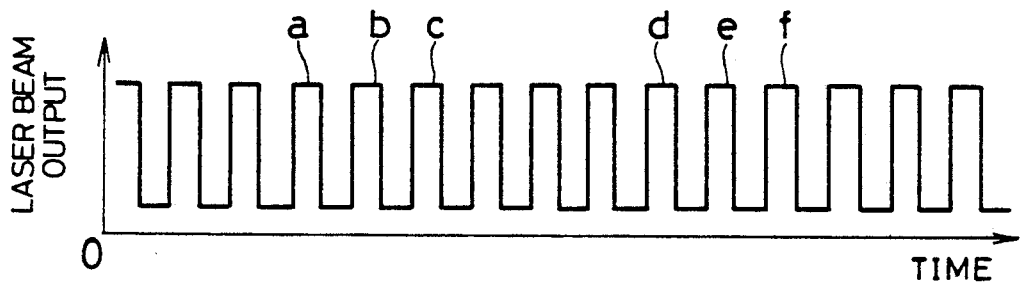
FIG. 8(a) is a timing chart showing the output of a laser beam to be irradiated.
Figure 8B:
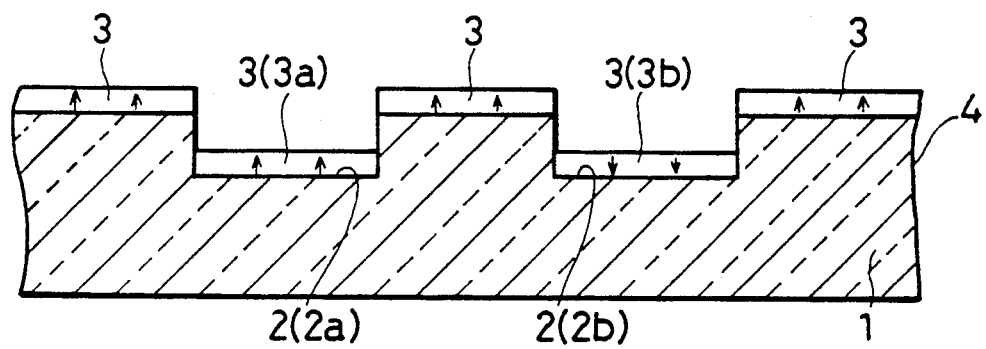
FIG. 8(b) is a sectional view illustrating the magneto-optical recording element in conjunction with FIG. 8(a).
Figure 8C:
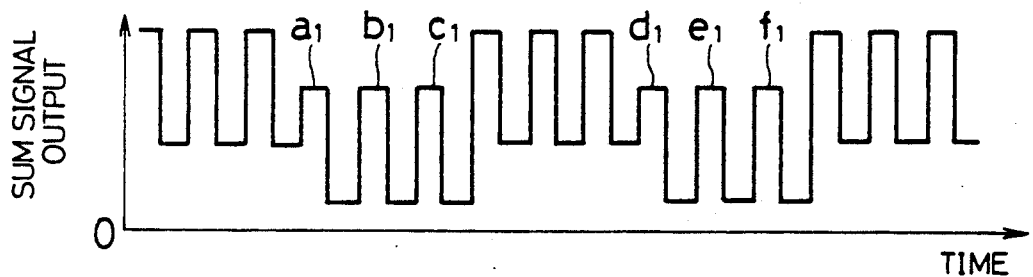
FIG. 8(c) is a timing chart of a sum signal which indicates the sum of the outputs of two PIN photodiodes.
Figure 8D:
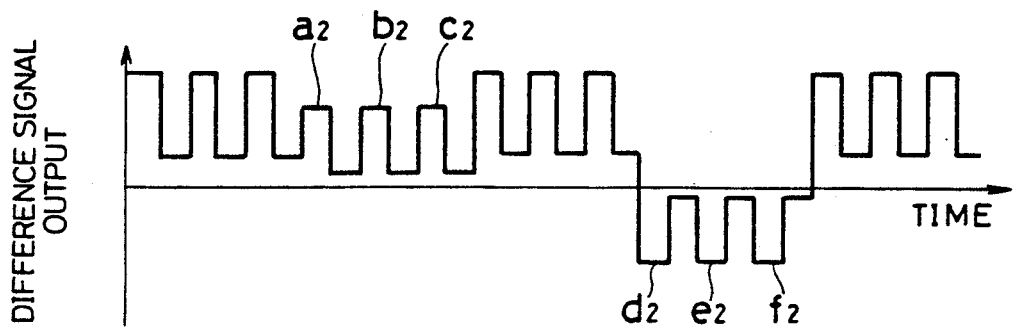
FIG. 8(d) is a timing chart of a difference signal which indicates the difference between the outputs of the two PIN photodiodes.

As previously explained in the foregoing description it is necessary for this invention to control the irradiation of a laser beam so that three pulses generated therefrom correspond to one recording pit 2 of the magneto-optical recording element 4 (see FIGS. 8(a) and 8(b)). Indicidentally, five pusles are required to correspond to one recording pit 2 when the number of pulses for one recording unit is set to five. In order to realize the above arrangement, the following control is required.

FIG. 20 shows a diagram of a circuit for performing the above control.

FIG. 21 shows a waveform chart of signals generated in the circuit.

In FIG. 20, the optical recording element 4 mentioned above is rotated at a regular speed (CAV) by a motor 40. An optical pick-up device 41 includes the optical system shown in FIG. 7. The outputs of the PIN photodiodes 22 and 23 shown in FIG. 7 are entered in a differential amplifier 42 when a magneto-optical signal (RF signal) is generated. The outputs from the PIN photodiodes 22 and 23 are also added in an amplifier 43 in order to generate pit information. By detecting this pit information, an ID signal is obtained from an ID pit section 51 shown in FIG. 6 where signals for track addresses are stored. By means of a detecting section 44 for detecting the unique distance (time interval) between the reference pit 30 and inclined pit 31, a tracking error signal (RES signal) is obtained, which indicates to which side the light beam is displaced from the center of the track. This detecting section 44 comprises a waveform shaping circuit 32, time lag detector 33, and timing signal generator 34 as shown in FIG. 7.

FIG. 21(a) shows the waveform of an output from the amplifier 43, which indicates the positions of the pits. A reference pit detecting section 45 shown in FIG. 20 detects the passing of the reference pit 30 shown in FIG. 6 at the irradiating station. The reference pit detecting section 45 cannot detect the passing of the reference pit 30 at the very time the magneto-optical recording element 4 starts its rotation, but can detect it once the rotation has been started. More specifically, the presence of the sample pit can be detected by detecting the unique distance thereof, so that it is possible to estimate the arrival time of the reference pit of the next sample pit at the irradiating station. From the pit detection at the estimated time, the reference pit 30 can be detected. FIG. 21(b) shows the waveform of an output b of the reference pit detecting section 45. The counter 47 starts counting pulses from an oscillator 46 synchronized with the falling edge of the above output pulse. The counter 47 is designed to generate a single pulse when counting to a prefixed number. FIG. 21(c) shows the waveform of an output c of the counter 47. The time elapsed until the counter 47 counts to a prefixed number corresponds to the time elapsed until the light beam comes just in front of a first pit coming immediately after the next inclined pit 31 and after passing through one reference pit 30.

The output c of the counter 47 is transmitted to a central processing unit (CPU) 50, which transmits a recording information signal d synchronized with the falling edge of the pulse of the output c. The recording information signal d is shown in FIG. 21(d). The recording information signal d and the pulses from the oscillator 46 are transmitted to a power control unit 48. Upon receipt of the above signal and pulses, the power control unit 48 generates a signal, three pulses of which correspond to one recording bit (the recording pulse is synchronized with the timing of the pulses from the oscillator 46). As shown in FIG. 9(b), the center pulse is only of a high level among three at the time of recording. An output e of the power control unit 48 is transmitted to a semi-conductor laser driving circuit 49 and in accordance with the output of the semi-conductor laser driving circuit 49, the semi-conductor laser disposed in the pick-up device 41 is driven.

In the use of a circuit having the above construction, the laser beam can be precisely irradiated on the recording pit 2 which is a first pit coming immediately after the laser beam has passed through the sample pits 30 and 31. Once the laser beam can be correctly irradiated on the above first coming pit 2, the positioning of a beam spot is automatically carried out as to the successive recording pits 2, since the time interval between two recording pits 2 is fixed. The above described signal processing enables be control signals so that three pulses correspond to each recording pit 2.

While the processing of recording signals has been explained in the foregoing description, similar processing can be applied to the retrieval of information.

As described above, the combination of the optical recording element and its driving system of the present invention enables them to record information in a non-continuous area with a light beam, the output of which can be varied as required, and check whether the recording has been correctly carried out, during the time when the light beam passes through the non-continuous area. In order to accomplish the above operation, a laser beam is not necessarily emitted in the form of pulses, but the output of the light beam may be arranged to be modulated only when the light beam passes through the pit 2. To employ a pulsed laser beam has the advantage that it facilitates distinguishing a pulse for detecting the direction of the magnetization, a pulse for reversing the direction of the magnetization and a pulse for checking the direction of the magnetization.

In the foregoing, the rising edge of each pulse corresponds to the edge of the pit 2 as shown in FIGS. 8(a) and 8(b), but the present invention is not limited to this. Further, since the presence of the pit 2 is detected by the sum signal of the PIN photodiodes 22 and 23 in this embodiment, the aforesaid pulses for detecting/reversing/checking the direction of the magnetization may be determined in synchronization with the sum signal.

The mechanism for reversing the direction of magnetization of the recording film for recording information is not limited in this invention. For example, the direction of the magnetization may be reversed by the demagnetizing field of the recording film itself or by the external magnetic field of a resonant coil. This intention can be applied to the information recording of both so-called optical modulation systems and magnetic field modulation systems.

An optical recording element according to present invention is not limited to the magneto-optical recording element 4 employed in this embodiment, but may be any recording element comprising a recording film on which information can be recorded by changing the temperature thereof and from which recorded information can be read out by changing the conditions of a light beam (luminous energy, polarization etc.).

The optical recording element of the present invention is characterized in that the size of the recording films is limited to that of the recording bit. In other words, the recording films have the same size as the recording bit, and are placed with the spacings equal to the bit-to-bit spacing.

Since the recording films described above are designed in the form of pits so as to prevent the extension of the recording bits, the quality of a signal read by an optical memory system can be highly improved with less occurence of crosstalk resulting in a high-quality optical recording element.

Another alternative optical recording element according to the present invention is characterized in that a substrate is provided with sample pits disposed at intervals of a fixed distance in the access direction of a light beam. At least on the tracking error detection sections constitutes the sample pit being inclined with respect to said access direction.

In the above described optical recording element, when the sample pit comprises two tracking error detection sections, the time lag between the generation of a read out signal from one of the tracking error detection sections and generation of a read out signal from the other tracking error detection section is detected, said signal generation being caused by the access of a light beam. That is, the phase difference between read out signals respectively generated from the pair of tracking error detection sections is varied in accordance with the displacement amount of the light beam which accesses the position shifted from the center of a track in a direction perpendicular to the track. Therefore, a tracking error can be detected by obtaining the phase difference between the read out signals respectively generated from the pair of tracking error detection sections.

Since a single-unit photodetector is employed in this case instead of a two-separate one, even if the substrate is inclined, this will not exert an adverse effect on the tracking error detection signal. Furthermore, tracking errors can be detected in accordance with the phase difference between read out signals respectively generated from the pair of tracking error detection sections, so that when the tracking error detection sections are in the form of pits or grooves, the influence of variations in the width and depth of them will be reduced so as to perform accurate tracking error detection.

Further, although it is necessary to accurately determine the relative positions of one pair of tracking error detection sections, such accuracy is not required in positioning one pair of tracking error detection sections in relation to another pair of tracking error detection sections as required in the conventional sampling method. This is an advantage in manufacturing the optical recording element at low cost.

Another alternative optical recording element according to the present invention is characterized as comprising an information recording area formed in every recording unit in a non-continuous condition, and its driving system is characterized as comprising means by which the following steps are carried out during the time a light beam passes through a non-continuous recording area: information is recorded in this non-continuous recording area or information therein is erased, with the light beam the output of which is varied as required; and it is checked whether recording or erasing functions have been correctly performed.

In this arrangement, there is no need to wait for the optical disk to rotate. This significantly reduces the total time required for recording/erasing operation and its check.

The invention being thus described, it may be obvious that the same may be varied in many ways. Such variations are not be regarded as a departure from the scope of the invention.

What is claimed is:

1. An optical recording element for recording, erasing and reproducing information using a light beam, said element divided into a plurality of circular tracks for holding information, said element comprising:
   a recording medium including an information recording area having a plurality of recording pits formed in a non-continuous manner in a rotational direction; and
   said recording medium further including a plurality of sample pit groups disposed at intervals of a fixed distance from and among said plurality of recording pits for providing basic information about the location of said recording pits formed in the same track and track location, each of said sample pit groups being defined by a plurality of sample pits disposed among the plurality of the recording pits so that the spacing between the sample pits differ from the spacing between the recording pits, and wherein one of said plurality of sample pits constituting a said sample pit group being elongated and inclined at an angle with respect to the direction of the circular tracks.

2. An optical recording element for recording, erasing and reproducing information using a light beam, said element divided into a plurality of circular tracks for holding information, said element comprising:
   a recording medium including an information recording area having a plurality of recording pits formed in a non-continuous manner in a rotational direction;
   said recording medium further including a plurality of sample pit groups disposed at intervals of a fixed distance from and among said plurality of recording pits for providing basic information about the location of said recording pits formed in the same track and track location, each of said sample pit groups being defined by a plurality of sample pits disposed among the plurality of the recording pits so that the spacing between the sample pits differ from the spacing between the recording pits, wherein said recording medium comprises a transparent substrate, said transparent substrate having on one surface thereof the recording and sample pits disposed at regular intervals about the surface of said substrate, each of said sample and recording pits having specified depth defining walls; and
   a plurality of recording films, each including a magnetic film having vertical magnetic anisotropy.

3. An optical recording element for recording, erasing and reproducing information using a light beam, said element divided into a plurality of circular tracks for holding information, said element comprising:
   a recording medium including an information recording area having a plurality of recording pits formed in a non-continuous manner in a rotational direction;
   said recording medium further including a plurality of sample pit groups disposed at intervals of a fixed distance from and among said plurality of recording pits for providing basic information about the location of said recording pits formed in the same track and track location, each of said sample pit groups being defined by a plurality of sample pits disposed among the plurality of the recording pits so that the spacing between the sample pits differ from the spacing between the recording pits, and
   barriers for preventing heat generated by said light beam when irradiated on a recording pit in which information is to be recorded from being transferred outside the recording pit thereby avoiding heat extension among adjacent recording pits.

4. An optical recording element according to claim 3, wherein said barriers include the walls of the pits formed on the substrate of the recording medium.

5. An optical recording element according to claim 2, wherein said plurality of recording films being discreetly formed in the bottom of said recording and sample pits and about the remaining surface of said recording medium.

6. An optical recording element according to claim 2, wherein each of said recording films defined by a multiple-layer structure comprising:
   said transparent substrate;
   a first nitrogen compound layer formed of SiN;
   a magnetic film formed of a material from the group consisting of GdTbFe, TbFeCo, and GdNdFe;
   a second nitrogen compound layer formed of SiN;
   a reflective film formed from the elements of the group consisting of Al, Ta and Ti.

7. An optical recording element according to claim 6, wherein said magnetic film has a thickness preferably in the range of 150 Å to 300 Å.

8. An optical recording element according to claim 1, wherein said elongated inclined pit is inclined at an angle in the range of 6° to 80° with respect to the rotational direction of the circular tracks.

9. A system for driving an optical recording element having a plurality of recording and sample pits comprising:
   first detecting means for detecting time intervals at which a light beam passes through each of said plurality of sample pits for providing basic information about the locations of said recording pits, each of said sample pits being disposed among said plurality of recording pits so that the spacing between any two sample pits is different from the spacing between the recording pits; and
   second detecting means for detecting the locations of said plurality of sample pits in responsive to output from said first detecting means by comparing said time intervals between sample pits.

10. A system for driving an optical recording element according to claim 9 comprising,
an optical pick-up means having an optical system therein having:
an amplifier means for detecting the location of each sample pits upon receipt of an output released from said optical pick-up device;
a reference pit detecting means for detecting upon receipt of an output released from said amplifier that the light beam has passed through a reference pit from among the plurality of sample pits;
an oscillator for generating pulses on a predetermined standard frequency;
a counter for counting the pulses from the oscillator upon receipt of an output from the reference pit detecting means and for generating a single pulse when a prefixed count is reached;
a control device for generating a recording information signal upon receipt of an output from the counter;
a power control unit for generating at least three pulses for each recording pit upon receipt of said recording information signal and pulses from the oscillator; and
a semi-conductor laser driving circuit for driving the optical pick-up device for emitting a laser beam in the form of pulses according to an output from the power control unit.

11. A driving system for driving an optical recording element according to claim 10, wherein said pulses generated in said pulse control unit include a pulse for information recording whose level is higher than those of other pulses.

12. A driving system for driving an optical recording element according to claim 10, wherein said counter is designed such that the time required for generating a single pulse is equal to the time elapsed after the light beam passes through the reference pit until it reaches the front of a first recording pit immediately after detecting the next elongated inclined pit.

13. An optical recording element for recording, erasing and reproducing information using a light beam, said element divided into a plurality of circular tracks for holding information, said element comprising:
a recording medium including an information recording area having a plurality of recording pits formed in a non-continuous manner in a rotational direction;
said recording medium further including a plurality of sample pit groups disposed at intervals of a fixed distance from and among said plurality of recording pits for providing basic information about the location of said recording pits formed in the same track and track location, each of said sample pit groups being defined by a plurality of sample pits disposed among the plurality of the recording pits so that the spacing between the sample pits differ from the spacing between the recording pits; and
said sample pit groups disposed at intervals of a fixed distance in the access direction of said light beam on said substrate, each of said sample pit groups including a pair of pits for providing information regarding tracking errors, at least one of which is inclined with respect to the access direction of the light beam.

14. An optical recording element according to claim 1, wherein each of said sample pit group comprises:
a substantially round-shaped reference pit disposed in the center of one of said circular tracks; and
an elongated inclined pit inclined with respect to the direction of the circular track.

15. An optical recording element according to claim 1, wherein each of said sample pit groups comprises:
a first reference pit of substantially round shape disposed in the center of one of said circular tracks;
an elongated inclined pit inclined with respect to the track direction; and
a second reference pit disposed behind the inclined pit in the access direction of said light beam so that the spacing between the first reference pit and the inclined pit is equal to the spacing between the inclined pit and the second reference pit.

16. An optical recording element according to claim 1, wherein said sample pit group comprises a pair of inclined pits which are oppositely inclined in the access direction of the light beam.

17. An optical recording element according to claim 1, wherein said sample pit comprises a pair of inclined portions which are formed on one of said circular tracks having recording pits, and oppositely inclined in the access direction of the light beam.

18. An optical recording element according to claim 13, wherein said sample pit group comprises an elongated inclined pit inclined at an angle in the range of 6° to 80° to the access direction of the light beam.

* * * * *